US012071317B2

(12) United States Patent
D'Anglade

(10) Patent No.: US 12,071,317 B2
(45) Date of Patent: Aug. 27, 2024

(54) CONVOLUTE CARDBOARD TUBE, APPARATUS AND METHOD FOR MANUFACTURING THE SAME

(71) Applicant: ABZAC CANADA INC., Drummondville (CA)

(72) Inventor: Pierre-Michel D'Anglade, Drummondville (CA)

(73) Assignee: ABZAC CANADA INC., Drummondville (CA)

( * ) Notice: Subject to any disclaimer, the term of this patent is extended or adjusted under 35 U.S.C. 154(b) by 0 days.

(21) Appl. No.: 17/743,974

(22) Filed: May 13, 2022

(65) Prior Publication Data

US 2023/0119158 A1 Apr. 20, 2023

Related U.S. Application Data

(63) Continuation of application No. 17/503,068, filed on Oct. 15, 2021, now Pat. No. 11,370,628.

(51) Int. Cl.
*B65H 18/28* (2006.01)
*B31C 1/00* (2006.01)
(Continued)

(52) U.S. Cl.
CPC .............. *B65H 18/28* (2013.01); *B31C 1/04* (2013.01); *B31C 1/083* (2013.01); *B31C 11/00* (2013.01);
(Continued)

(58) Field of Classification Search
CPC .. B31C 1/04; B31C 1/083; B31C 1/00; B31C 11/00; B31C 11/04; B31C 11/06;
(Continued)

(56) References Cited

U.S. PATENT DOCUMENTS 2,213,253 A 9/1940 Novak
2,803,576 A 8/1957 Chase
(Continued)

FOREIGN PATENT DOCUMENTS

CA 2590067 A1 6/2006
EP 0740640 B1 5/2001
(Continued)

OTHER PUBLICATIONS

European Search Report received in European U.S. Appl. No. 22/170,287 mailed on Oct. 18, 2022, 2 pages.
(Continued)

*Primary Examiner* — Anne Marie Antonucci
*Assistant Examiner* — Luis G Del Valle
(74) *Attorney, Agent, or Firm* — Mintz Levin Cohn Ferris Glovsky and Popeo, P.C.

(57) ABSTRACT

A plastic film roll includes: a convolute cardboard tube including a tubular body having a tubular body wall formed by a plurality of layers of a straight rolled cardboard sheet having a weight equal to or less than 300 gsm; a plastic film wound about the convolute cardboard tube to form a plurality of plastic film windings around the convolute cardboard tube, the plastic film windings creating a radial compression force equal to or greater than 10 bar on the tubular body wall, wherein the cardboard sheet includes a plurality of fibers, at least a majority of the fibers being substantially aligned in a tangential direction relative to the tubular body to allow the convolute cardboard tube to resist the radial compression force.

17 Claims, 12 Drawing Sheets

(51) Int. Cl.

| | |
|---|---|
| ***B31C 1/04*** | (2006.01) |
| ***B31C 1/08*** | (2006.01) |
| ***B31C 11/00*** | (2006.01) |
| ***B31C 11/04*** | (2006.01) |
| ***B31C 11/06*** | (2006.01) |
| ***B65H 18/00*** | (2006.01) |
| ***B65H 75/10*** | (2006.01) |

(52) U.S. Cl.

CPC .............. *B31C 11/04* (2013.01); *B31C 11/06* (2013.01); *B65H 75/10* (2013.01); *B31C 1/00* (2013.01); *B65H 18/00* (2013.01); *B65H 2401/112* (2013.01)

(58) Field of Classification Search

CPC .. B65H 18/28; B65H 18/00; B65H 2401/112; B65H 75/10

See application file for complete search history.

(56) References Cited

U.S. PATENT DOCUMENTS

| | | | | |
|---|---|---|---|---|
| 2,814,313 | A | 11/1957 | Holbrook | |
| 3,228,308 | A | 1/1966 | Maurice | |
| 3,395,789 | A | 8/1968 | Oberry et al. | |
| 3,409,206 | A | 11/1968 | Slouka et al. | |
| 3,613,738 | A | 10/1971 | Witzig | |
| 3,704,730 | A | 12/1972 | Witzig | |
| 3,869,325 | A * | 3/1975 | Witzig | F16L 9/16 156/289 |
| 3,891,135 | A | 6/1975 | Szatkowski | |
| 3,983,905 | A | 10/1976 | Witzig | |
| 4,257,316 | A | 3/1981 | Roder et al. | |
| 4,270,443 | A | 6/1981 | Mcswiney et al. | |
| 4,710,252 | A | 12/1987 | Kadunce | |
| 4,950,518 | A | 8/1990 | Walliser | |
| 5,100,496 | A | 3/1992 | Mitchell | |
| 5,106,356 | A | 4/1992 | Rhodes et al. | |
| 5,505,395 | A | 4/1996 | Qiu et al. | |
| 5,514,429 | A | 5/1996 | Kamihgaraguchi et al. | |
| 5,586,963 | A | 12/1996 | Lennon et al. | |
| 5,707,328 | A | 1/1998 | Sato et al. | |
| 6,036,139 | A | 3/2000 | Ogg | |
| 6,106,451 | A | 8/2000 | Andreasson | |
| 6,145,196 | A | 11/2000 | Ripstein | |
| 6,815,022 | B2 | 11/2004 | Renck et al. | |
| 6,851,643 | B2 | 2/2005 | Qiu et al. | |
| 7,331,504 | B2 | 2/2008 | Languillat et al. | |
| 7,533,845 | B2 | 5/2009 | Neveu et al. | |
| 7,842,362 | B2 | 11/2010 | Kim et al. | |
| 9,561,929 | B2 | 2/2017 | Mellin et al. | |
| 9,756,991 | B2 | 9/2017 | Mellin | |
| 11,370,628 | B1 | 6/2022 | D'anglade | |
| 2004/0052987 | A1 | 3/2004 | Shetty et al. | |
| 2004/0232274 | A1 | 11/2004 | Gardner | |
| 2005/0089653 | A1 * | 4/2005 | Shoshany | B32B 3/28 156/190 |
| 2005/0260365 | A1 | 11/2005 | Niu et al. | |
| 2005/0271839 | A1 | 12/2005 | Pierce et al. | |
| 2005/0279814 | A1 | 12/2005 | Drummond | |
| 2006/0026997 | A1 * | 2/2006 | Sweetman | B65H 75/10 65/435 |
| 2009/0236466 | A1 * | 9/2009 | D'Anglade | B65H 75/505 29/605 |
| 2016/0288444 | A1 * | 10/2016 | D'Anglade | B31C 11/06 |
| 2022/0126553 | A1 * | 4/2022 | Villaescusa | D21H 27/32 |
| 2022/0259882 | A1 * | 8/2022 | Chambers | E04C 3/36 |

FOREIGN PATENT DOCUMENTS

| | | | |
|---|---|---|---|
| EP | 1405811 | B1 | 3/2006 |
| EP | 3323605 | B1 | 3/2020 |
| GB | 1168696 | A | 10/1969 |
| JP | H04185327 | A | 7/1992 |
| JP | 2002001842 | A | 1/2002 |
| JP | 2003192237 | A | 7/2003 |
| WO | 2020115129 | A1 | 6/2020 |
| WO | 2021004952 | A1 | 1/2021 |

OTHER PUBLICATIONS

Paper Tubes accessed on Jan. 22, 2022, Industrial Quick Search,, https://www.iqsdirectory.com/articles/cardboard/paper-tube.html>, 53 pages.

* cited by examiner

FIG. 9E
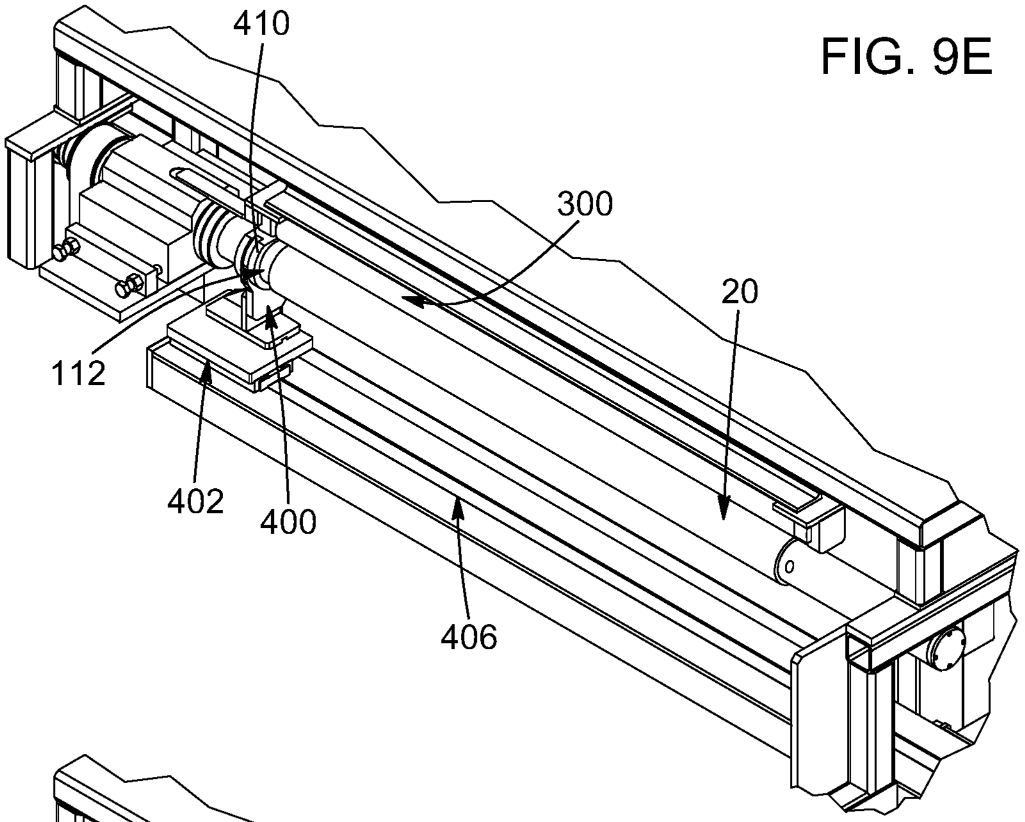
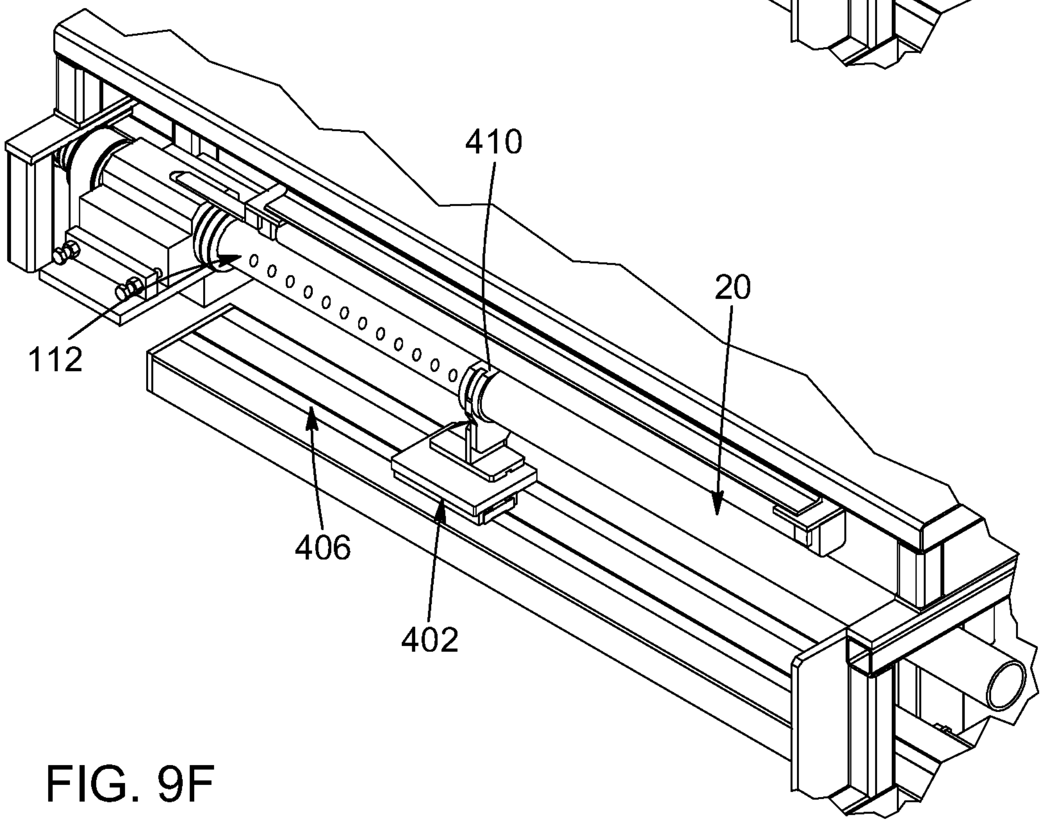
FIG. 9F

CONVOLUTE CARDBOARD TUBE, APPARATUS AND METHOD FOR MANUFACTURING THE SAME

CROSS-REFERENCE TO RELATED APPLICATIONS

This application is a continuation and claims priority to U.S. patent application Ser. No. 17/503,068, filed on Oct. 15, 2021 and entitled "CONVOLUTE CARDBOARD TUBE, APPARATUS AND METHOD FOR MANUFACTURING THE SAME," the disclosure of which is incorporated by reference herein in its entirety.

TECHNICAL FIELD

The present disclosure generally relates to cardboard tubes and cores, and more particularly relates to convolute cardboard tubes and to apparatuses and methods for manufacturing the same.

BACKGROUND

Cardboard tubes used for winding films, such as extensible or stretchable films often made of plastic, must resist certain forces of radial compression. Cardboard tubes made for winding extensible films rolls are normally made by laminating several plies of cardboard, which are then spiraled at a 30-degree angle until the tubes have the desired width. The width of the spiraled tubes is function of the quality of the film to be wound around the tube, and of the diameter of the film roll.

The main parameters commonly used when developing cardboard tubes are the ring crush resistance of the cardboard used for forming the tube (measured by the force required to crush a cardboard cylinder when exerting an axial crushing force to the edges of the cylinder) and the delaminating resistance of the cardboard (measured by the force required to split a cardboard in two in its thickness). These parameters are commonly used when developing tubes and cores for the winding of paper rolls, and they may not be appropriate for the design of tubes used in applications involving radial compression, as paper rolls exert a linear compression on the tubes, rather than a radial compression. In addition, in spiraled winding cores, a small space is often present between two successive strips (or plies) of paper. This spacing is subject to lead to a break in the core when the core is subject to radial compression.

Until now, cardboard tubes devised for plastic film applications have been made using cardboard that has fibers oriented in multiple directions, as it is generally believed that this arrangement strengthens the tubes. For increasing the strength of spiraled tubes, a known technique requires using of several plies of cardboard, which means that the thickness of the wall of the tube must be increased and be relatively large, even for rolls having small lengths. Another known technique consists of using more resistant cardboard, which generally costs more and thus increases the price of the cardboard tubes.

Spiraled cardboard tubes were originally designed for winding rolls of paper, and their use for the winding of extensible or plastic films mainly comes from the fact that manufacturers of cardboard tubes and cores favoured using a single machine and process when manufacturing the tubes, for obvious economical reasons. However, spiraled tubes may not be the best choice for applications involving radial compression, as they have not been specifically designed to resist to such radial compression.

Straight rolling a web of cardboard is another method of manufacturing cardboard tubes and cores. While this method was commonly used when cardboard tube manufacturing began, it is now less so, because of the difficulty in manufacturing cores of various lengths and because increasing the strength of the tube requires increasing the number of windings, which in turn leads to a significant increase of the diameter and weight of the tube, which may not be either practical or economical.

Canadian Patent No. 2 590 067 describes a method for reusing rolls that are rejected from paper and cardboard factories by forming them into straight rolled cores for the paper and cardboard industry. While this method provides the advantage of reusing rejected rolls within a paper mill, it suffers from the drawbacks of straight rolls described above.

It would therefore be desirable to provide a cardboard tube specially adapted for the winding of extensible and/or plastic films which can resist radial compression while remaining inexpensive and relatively easy to manufacture.

SUMMARY

According to one aspect, there is provided an improved cardboard tube that satisfies at least one of the above-mentioned needs.

Accordingly, there is provided a plastic film roll comprising: a convolute cardboard tube comprising a tubular body having a tubular body wall formed by a plurality of layers of a straight rolled cardboard sheet having a weight equal to or less than 300 gsm; a plastic film wound about the convolute cardboard tube to form a plurality of plastic film windings around the convolute cardboard tube, the plastic film windings creating a radial compression force equal to or greater than 10 bar on the tubular body wall, wherein the cardboard sheet includes a plurality of fibers, at least a majority of the fibers being substantially aligned in a tangential direction relative to the tubular body to allow the convolute cardboard tube to resist the radial compression force.

In at least one embodiment, the wall has a wall thickness of less than about 7.5 mm.

In at least one embodiment, the radial compression force created by the plastic film winding on the tubular body wall is equal to or greater than 35 bar.

In at least one embodiment, the wall thickness is less than 5 mm and wherein the radial compression force created by the plastic film winding on the tubular body wall is equal to or greater than 28 bar.

In at least one embodiment, the plastic film winding are machine-wound around the convolute cardboard tube.

In at least one embodiment, all the fibers are substantially aligned in a tangential direction relative to the tubular body.

In at least one embodiment, the tubular body has a tensile resistance equal or higher than 60 kg/mm.

In at least one embodiment, the cardboard sheet has a weight equal to or less than about 140 gsm.

In at least one embodiment, the plurality of layers of the straight rolled cardboard sheet include from 6 and 10 layers.

In at least one embodiment, the cardboard sheet includes a cut edge defining a shoulder on the external surface of the tubular body, the shoulder having a height substantially equal to or less than about 1.2 mm.

In at least one embodiment, the tubular body has a humidity level equal or lower to 7%.

In at least one embodiment, the tubular body has a humidity level substantially equal or lower to 6%.

In at least one embodiment, the tubular body has a humidity level substantially equal to 4.5%.

In at least one embodiment, the cardboard sheet is made from trimmed cardboard.

In at least one embodiment, the cardboard sheet has a sheet width defined in a transversal direction of the cardboard sheet, the sheet width being substantially equal to a length of the tubular body.

In at least one embodiment, the plurality of layers of the straight rolled cardboard sheet of cardboard are glued together using an adhesive selected from a group consisting of: polyvinyl acetate (PVA), dextrin and silicate.

In at least one embodiment, the tubular body has an inside diameter of between about 40 mm and 200 mm.

In at least one embodiment, the tubular body has an inside diameter of between about 74 mm and 78 mm.

In at least one embodiment, the tubular body has a inside diameter of about 76 mm.

In at least one embodiment, the straight rolled cardboard sheet has a sheet thickness of between about 0.72 mm and 1.2 mm.

According to another aspect, there is also provided a convolute tube manufacturing apparatus for manufacturing convolute cardboard tubes, the apparatus comprising: a frame extending between an input end and a n output end located opposite the input end, the frame being configured for receiving a roll of cardboard so as to allow rotation of the roll about a roll axis; a tube forming roller rotatably connected to the frame, the tube forming roller having a tube roller axis, the tube forming roller being oriented such that the tube roller axis is substantially parallel to the roll axis, the tube forming roller further comprising a prehension mechanism for engaging an end edge of the roll of cardboard so as to convolute the roll of cardboard around the tube forming roller as the tube forming roller rotates to form a convolute cardboard tube.

In at least one embodiment, the apparatus further comprises a tube removal assembly for removing the formed convolute cardboard tube from the tube forming roller.

In at least one embodiment, the tube removal assembly includes a carriage movable along a travel path parallel to the tube roller axis and an abutting element secured to the carriage and located proximal to the tube forming roller.

In at least one embodiment, the abutting element includes an annular member extending coaxially around the tube forming roller.

In at least one embodiment, the annular member has an inner diameter which is smaller than an outer diameter of the formed convolute cardboard tube such that movement of the carriage along its travel path causes the annular member to push the formed convolute cardboard tube.

In at least one embodiment, the prehension mechanism includes at least one suction opening defined in the tube forming roller and a suction actuator operatively connected to the at least one suction opening to provide suction through the at least one suction opening.

In at least one embodiment, the at least one suction opening includes a plurality of suction openings aligned with each other substantially parallel to the tube roller axis.

In at least one embodiment, the tube forming roller further includes a plurality of suction nozzle members, each suction nozzle member being received in a corresponding suction opening, each suction nozzle member being movable between an extended position in which the suction nozzle member extends partially outwardly from the corresponding suction opening and a retracted position in which the suction nozzle member is fully retracted within the tube forming roller.

According to another aspect, there is also provided a convolute tube manufacturing apparatus for manufacturing convolute cardboard tubes, the apparatus comprising: a frame extending between an input end and an output end located opposite the input end; a roll of cardboard rotatably receivable on the frame, the roll of cardboard being rotatable about a roll axis, the roll of cardboard including a plurality of fibers, at least a majority of the fibers being aligned in a tangential direction relative to the roll of cardboard; a tube forming roller rotatably connected to the frame, the tube forming roller having a tube roller axis, the tube forming roller being oriented such that the tube roller axis is substantially parallel to the roll axis, the tube forming roller further comprising a prehension mechanism for engaging an end edge of the roll of cardboard so as to convolute the roll of cardboard around the tube forming roller as the tube forming roller rotates to form a convolute cardboard tube including the fibers aligned in a tangential direction of the convolute cardboard tube.

According to yet another aspect, there is also provided a method for manufacturing a convolute cardboard tube, the method comprising: unwinding a roll of a preselected cardboard in a machine direction tangential to the roll of the preselected cardboard, thereby obtaining an unwound cardboard sheet, the preselected cardboard including a plurality of fibers oriented in the machine direction; straight rolling the unwound cardboard sheet into a convolute cardboard tube, the convolute cardboard tube including the fibers oriented in the machine direction; cutting the unwound cardboard sheet along its width.

In at least one embodiment, the method further comprises: after unwinding the roll of preselected cardboard, applying adhesive to the unwound cardboard.

In at least one embodiment, the preselected cardboard includes trimmed cardboard.

In at least one embodiment, cutting the unwound cardboard sheet along its width is performed after the straight rolling of the unwound cardboard sheet into the convolute cardboard tube to separate the convolute cardboard tube from a rest of the unwound cardboard sheet.

In at least one embodiment, the preselected cardboard has a tensile resistance equal or greater than 60 kg/mm.

In at least one embodiment, the method further comprises drying the convolute cardboard tube until the tube has a humidity level of less than or equal to 7%.

In at least one embodiment, the method further comprises connecting at least two convolute cardboard tubes for forming a convolute cardboard tube of a desired length.

In at least one embodiment, the method further comprises cutting the convolute cardboard tube along its length to form at least one convolute cardboard tube piece having a desired length.

In at least one embodiment, unwinding the roll of the preselected cardboard includes rotating the roll along a first rotation axis.

In at least one embodiment, straight rolling the unwound cardboard sheet includes rotating the unwound cardboard sheet along a second rotation axis parallel to the first rotation axis.

In at least one embodiment, unwinding the roll of the preselected cardboard and straight rolling the unwound cardboard sheet are performed simultaneously.

The convolute cardboard tube disclosed hereinafter is less expensive to produce than existing spiraled or straight rolled cardboard tubes since it minimizes the raw materials required to form the tube, while being more resistant to the radial forces exerted on the tube by the extensible film wound around it.

In addition, since the raw materials for forming the convolute cardboard tube come from rolls of trimmed cardboard, that is, rolls of rejected cardboard, manufacturing costs are reduced even further, since trimmed cardboard rolls are less expensive than the rolls normally used for such tubes. Furthermore, using trimmed cardboard rolls as the raw material creates a positive impact on the environment since it does not require the manufacturing of new cardboard rolls, reducing greenhouse effects.

Since trimmed cardboard rolls come in lengths that correspond to the lengths of the tubes generally required for the winding of plastic films, that is, between 15 and 21 inches, the cardboard from trimmed cardboard rolls generally does not require any cutting along its length, reducing the steps required to manufacture the convolute cardboard tube of the invention. It also eliminates the need to connect several tubes together to form a convolute tube of the desired length.

BRIEF DESCRIPTION OF THE DRAWINGS

FIG. 9E is a perspective view of a portion of the apparatus illustrated in FIG. 5, with the upper holding roller raised above the convolute cardboard tube to free the convolute cardboard tube.

FIG. 9F is a perspective view of a portion of the apparatus illustrated in FIG. 5, with the convolute cardboard tube partially removed from the tube forming roller by a tube removal assembly.

Figure 1A:
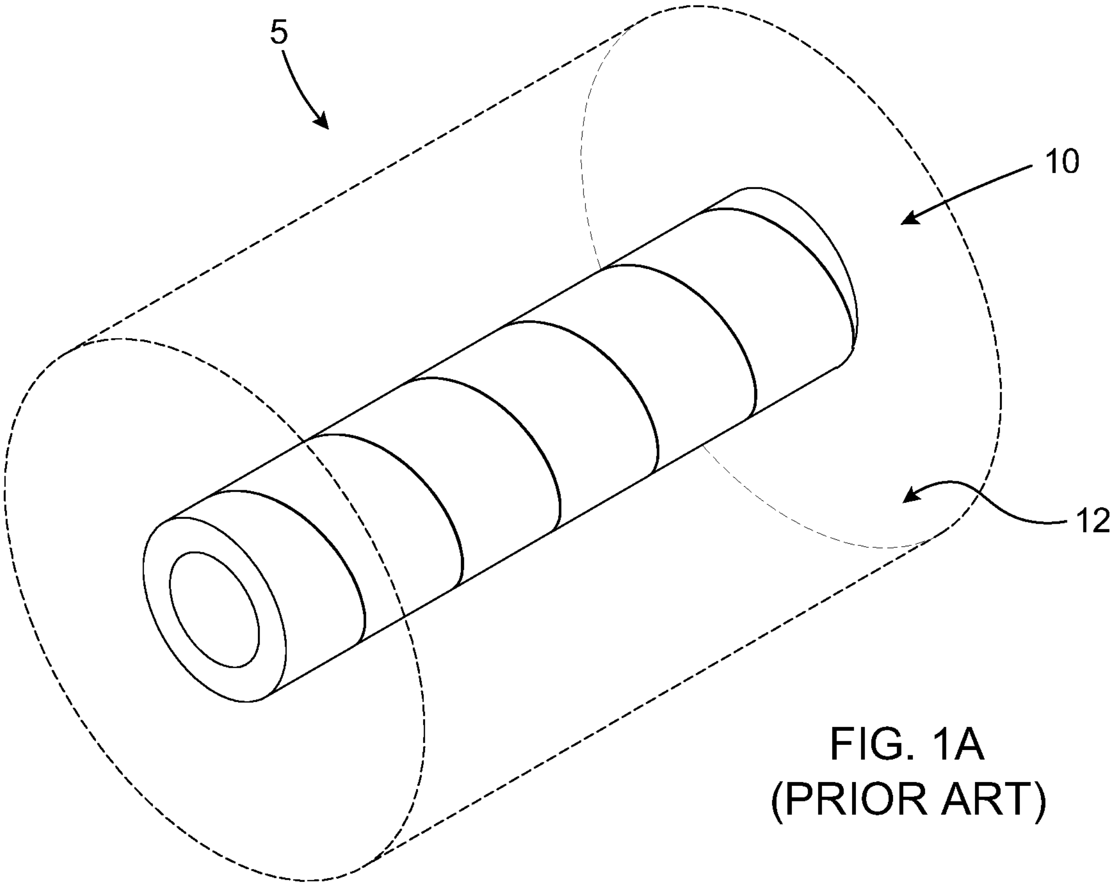
FIG. 1A (PRIOR ART)
FIG. 1A (PRIOR ART) is a perspective view of a prior art spiraled cardboard tube used for winding plastic or extensible plastic films.

While the invention will be described in conjunction with example embodiments, it will be understood that the scope of the invention should not be limited to such embodiments. On the contrary, it is intended to cover all alternatives, modifications and equivalents as may be included and defined in the present description.

DETAILED DESCRIPTION

In the following description, similar features in the drawings have been given similar reference numerals. For the sake of clarity, certain reference numerals have been omitted from the figures if they have already been identified in a preceding figure.

The resistance of tubes to radial forces can be measured with measuring systems specifically designed for the paper and cardboard industry.

Through several experiments, the applicant uncovered that straight rolled cardboard tubes, or convolute wound cardboard tubes, offer better resistance to radial forces than the commonly used spiraled cardboard tubes.

The term “cardboard” refers to a paper-based material varying in thickness and rigidity according to the purpose for which it is to be used.

The term “convolute cardboard tube” refers to a straight wound or straight rolled tube, as opposed to a spirally wound tube. Each “layer” of the convolute tube's wall refers to a single winding of the cardboard sheet.

Specifically, in at least some circumstances, an improvement of the radial force resistance of at least about 21% between a convolute cardboard tube and a conventional spiraled tube having a same wall thickness has been observed.

It was also found that in some circumstances, the resistance of straight rolled tubes to radial forces may be a function of one or more of the following parameters:

the tensile resistance (in kg/mm);

the length and/or orientation of the fibers in the cardboard; and the humidity level within the walls forming the tube.

Further experiments have shown that the resistance of straight rolled cardboard tubes to radial compression is sufficient when the tensile resistance is greater than or equal to 60 kg/mm or about 5900 bar·mm. The test to determine this ratio consists of attaching the upper end of a sheet of cardboard, for example of 5 mm (width)×100 mm (length), and of applying a load at its lower opposite end, until the sheet ruptures. The ratio is obtained by dividing the load (in kg) by the thickness (in mm) of the sheet.

By testing the radial compression of several tubes made from different types of cardboard, it was also found that, contrary to the generally held belief that tubes made of cardboard sheets with multidirectional-oriented fibers are more resistant, tubes made of cardboard having a majority of their fibers or all of their fibers substantially oriented in the direction of the winding of the tube—i.e. in a tangential direction relative to the tube—proved to be the most resistant to radial forces.

In some cases, the humidity level within a cardboard tube may further affect its overall resistance. When performing a flat crush test (during which the tube is placed between two compressing plates which apply pressure on the wall of the tube perpendicularly to a longitudinal axis of the tube), it has been found that a 1% difference in the humidity level of the tube could result in a 4 to 5% loss of resistance of the tube to crushing forces. For example, if the level of humidity in the tube is 5%, it will require a pressure of 10 bars to flat crush the tube, while when the level of humidity is 6%, the pressure require to flat crush the tube will be around 9.5 bars.

Experiments performed by the applicant have shown that when testing the resistance of tubes to radial compression in which forces are applied to the tube in a radial direction relative to the tube (rather than to straight or perpendicular compression, as described above), a 1% difference in the humidity level of the tube results in a 10%-12% loss of resistance of the tube. Other experiments performed by the applicants have shown that a tube has sufficient radial compression resistance when the humidity level within the tube is less then 7%, or more specifically of less than 6%, and that its resistance is stabilized when the humidity level is around 4.5%.

Figure 1B:
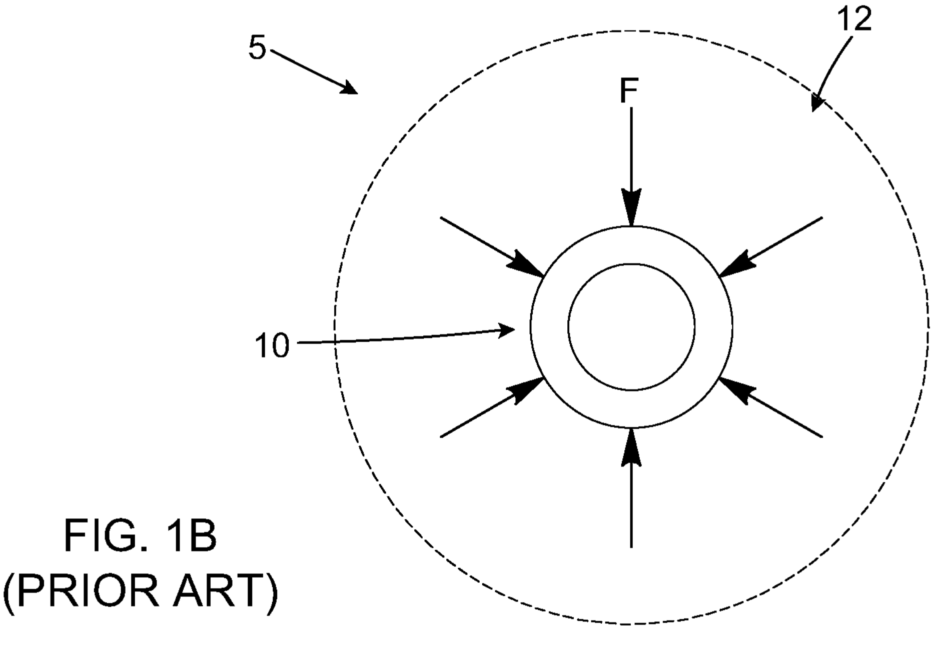
FIG. 1B (PRIOR ART)
FIG. 1B (PRIOR ART) Dis a front view of the prior art spiraled cardboard tube of FIG. 1.

Referring to FIG. 1, there is shown a conventional plastic film roll 5 comprising a conventional spiraled cardboard tube 10 and a plastic film or extensible film 12 wound around the tube 10. Because of its extensible properties, the plastic film 12 compresses the tube on which it is wound with a radial compression force F which is generally distributed all around the circumference of the tube 10 radially relative to the tube 10 and towards a central longitudinal axis of the tube 10. By contrast, a tube on which is wound a material with different properties, such as paper which is not substantially extensible, would not be subjected to radial forces. Instead, the main force to which the tube would be subjected would be a downward force from the weight of the paper on the tube, which would tend to compress or bend the tube.

Figure 2A:
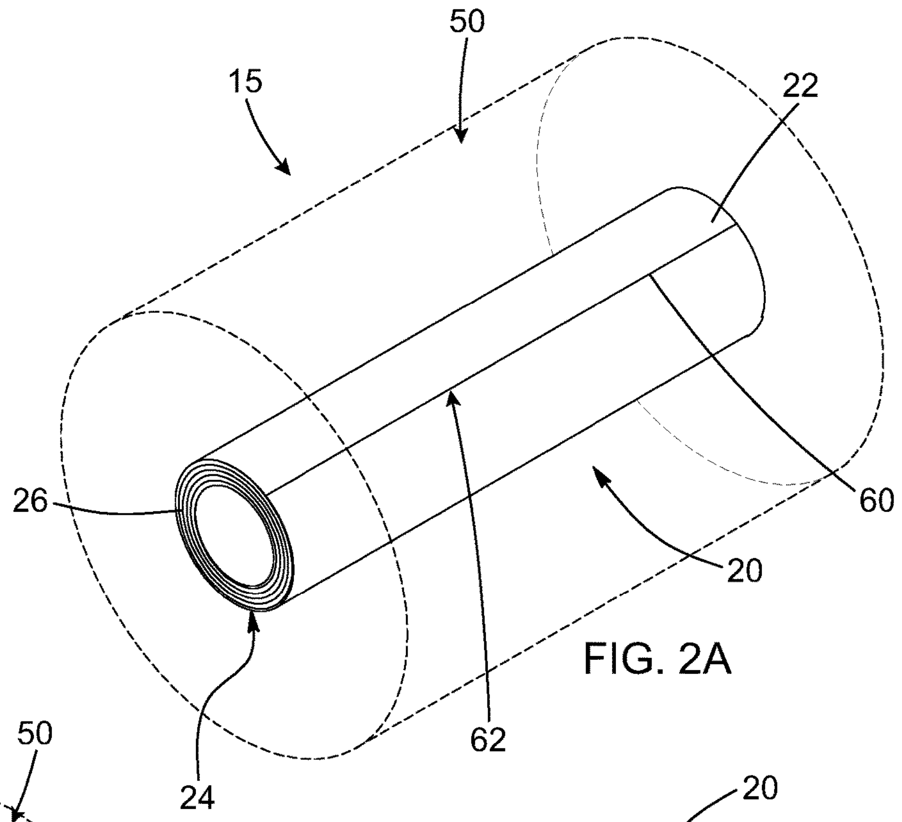
FIG. 2A is a perspective view of a convolute cardboard tube, according to one embodiment of the invention, showing shows the convolute cardboard tube with a plastic film wound around it, with radial forces compressing the tube.
Figure 2B:
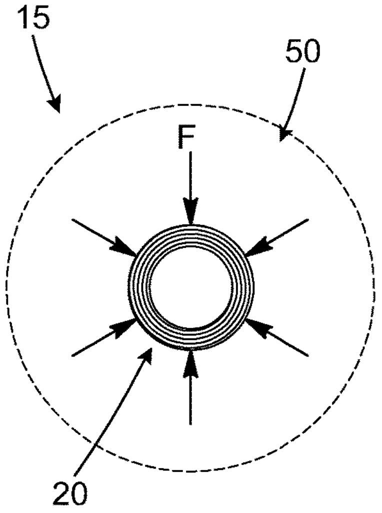
FIG. 2B is a front view of the tube illustrated in FIG. 2A.

With reference to FIGS. 2A and 2B, there is shown a plastic film roll 15, in accordance with one embodiment. The plastic film roll 15 includes a convolute cardboard tube 20 and a plastic film 50 wound around the convolute cardboard tube 20. Specifically, the plastic film 50 forms a plurality of plastic film windings around the convolute cardboard tube 20. The plastic film windings create a radial compression force F on the convolute cardboard tube 20, and the convolute cardboard tube 20 is designed to resist this radial compression force F. The convolute cardboard tube 20 has a tubular body 22 which is defined by a tubular body wall 24 formed by several layers 26 of a straight rolled cardboard sheet. Specifically, the body 22 of the tube 20 is made by convoluting or straight winding a continuous sheet of cardboard or paper-based material. The process of "convoluting" or "straight winding" means that each winding after the first winding is superposed over the previous winding in a winding direction which is substantially perpendicular to the longitudinal axis of the tube 20. In this configuration, the thickness of the wall 24 of the tube 20 therefore substantially corresponds to the thickness of the cardboard sheet multiplied by the number of times the sheet has been wound.

In one embodiment, the straight rolled cardboard sheet has a sheet thickness of between about 0.72 mm and 1.2 mm, and the tubular body 22 includes from 6 to 10 layers of the straight rolled cardboard sheet. Therefore, the wall 24 may have a wall thickness of less than 7.5 mm, and more specifically of less than 7.2 mm. Alternatively, the straight rolled cardboard sheet could have any other suitable thickness and the tubular body 22 could include less than 6 layers or more than 10 layers of the straight rolled cardboard sheet such that the wall 24 may have any other suitable wall thickness.

In one embodiment, the straight rolled cardboard sheet has a weight equal to or less than about 300 gsm or 300 $g/m^2$, and more specifically of less than about 140 gsm or 140 $g/m^2$. Alternatively, the straight rolled cardboard sheet could have any other suitable weight.

In one embodiment, the tubular body 22 has an inside diameter of between about 40 mm and 200 mm, and more specifically of between about 74 mm and 78 mm, and even more specifically of about 76 mm. Alternatively, the tubular body 22 may have any other suitable inner diameter.

In the illustrated embodiment, the cardboard sheet includes a cut edge 60 which is formed when the cardboard sheet is cut, either prior to forming the convolute cardboard tube 20 or after the cardboard convolute tube 20 is formed. The cut edge 60 corresponds to the end of the outermost winding of the cardboard sheet in the cardboard convolute tube 20. The cut edge 60 is secured on the external surface of the tubular body 22 and, due to the thickness of the cardboard sheet, defines a step or shoulder 62 on the external surface of the tubular body 22. The shoulder 62 may therefore have a height which corresponds substantially to the sheet thickness of the cardboard sheet. For example, in one embodiment, the shoulder 62 has a height which substantially equal to or less than about 1.2 mm, or more specifically between about 0.72 mm and 1.2 mm. Alternatively, the shoulder 62 may have any other suitable height.

In one embodiment, the layers of the cardboard sheet are glued together using an adhesive selected from a group consisting of: polyvinyl acetate (PVA), dextrin and silicate. Alternatively, the layers of the cardboard sheet could be secured together using any other suitable adhesive or any other suitable securing technique.

Figure 2C:
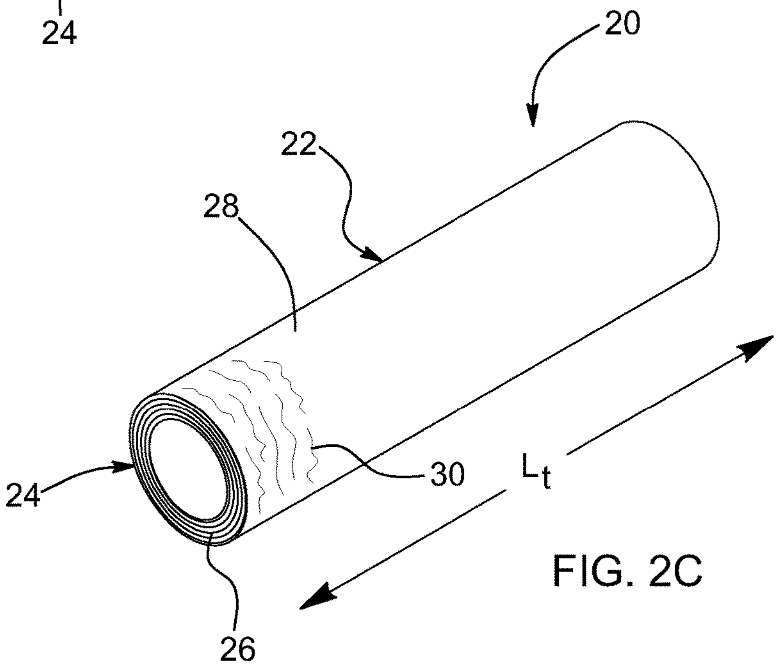
FIG. 2C is another perspective view of a convolute cardboard tube, according to a preferred embodiment of the invention.

As shown is FIG. 2C, the cardboard sheet 28 contains fibers 30 that are substantially oriented in the direction of the circumference of the tubular body 22. In other words, the fibers 30 are oriented in the direction of the winding of the cardboard sheet 28, or along the length of the unrolled continuous sheet 28 (i.e. in a tangential direction relative to the tube 20). The fibers 30 are also preferably long, as commonly found in cardboard or paper-based sheets used for boxes and bags. In one embodiment, all of the fibers 30 in the cardboard sheet 28 are aligned in the direction of the winding of the cardboard sheet 28. Alternatively, not all, but a majority of, the fibers are aligned in the direction of the winding of the cardboard sheet 28.

Figure 3:
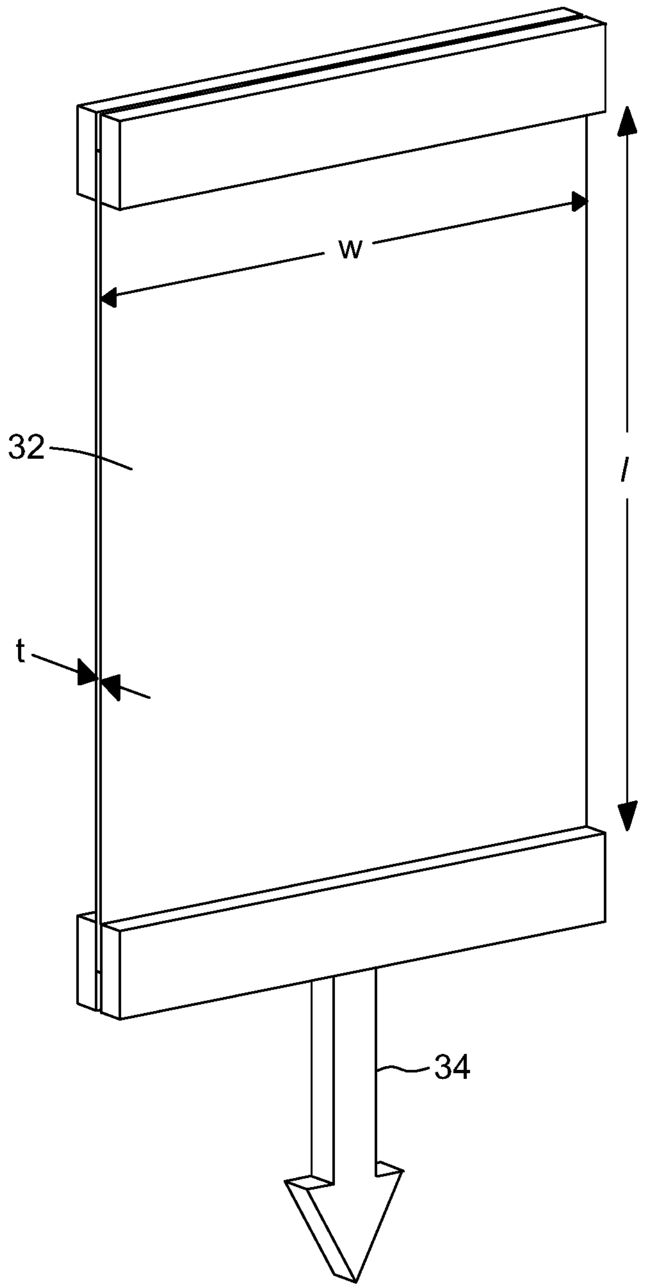
FIG. 3 is a perspective view showing a ring of cardboard during a Ring Crush Test.

In the illustrated embodiment, the cardboard used for forming the tube 20 is characterized by a tensile resistance ratio substantially equal to or greater than about 60 kg/mm. Alternatively, the cardboard used for forming the tube 20 could have a greater or lesser tensile resistance ratio. FIG. 3 shows an example of a method for measuring the tensile resistance ratio of a cardboard sheet such as the cardboard sheet 32. In this example, the tensile resistance ratio is measured by affixing the cardboard sheet 32 or a portion of the cardboard sheet 32, having a predetermined thickness t, length l and width w, at one end and by affixing a load 34 at its other end which creates tension in the cardboard sheet 32. The load is increased until the sheet 32 breaks or ruptures.

In one embodiment, the humidity level of the convolute cardboard tube 20, measured within the wall 24 of the tubular body 22, is substantially equal to or lower than about 7%, and more specifically substantially equal to or lower than about 6%, and even more specifically of 4.5%. It has been observed that in at least some circumstances, a humidity level below 7%, and more specifically below 6%, provides the tube 20 with an improved resistance to radial compressions. Alternatively, the convolute cardboard tube 20 could have a humidity level that is above about 7%.

While the cardboard sheet 32 used for forming the tube 20 may be specifically fabricated for this purpose, the cardboard sheet 28 preferably comes from rolls of trimmed cardboard. In other words, the raw material used to form the cardboard tube 20 comes from rejected paper from paper mills. This provides a tremendous advantage with regards to the costs of the raw material used to manufacture the cardboard tubes 20 for radial compression applications, since it directly reduces the overall cost of the tubes 20. Alternatively, the cardboard sheet 28 may not come from rolls of trimmed cardboard and may instead include other types of cardboard.

In one embodiment, the convolute cardboard tube 20 has a length $L_t$ and the cardboard sheet 32 comes from rolls having a length $L_r$ corresponding to the length $L_t$. This characteristic of the cardboard sheet 32 eliminates the need to cut the sheet along its length when manufacturing the tube 20. It also eliminates the need to connect several tubes together to form a convolute cardboard tube of a desired length. Indeed, rolls of trimmed cardboard $L_r$ generally come in lengths of 15 to 21 inches, which advantageously corresponds to the length $L_t$ of cardboard tubes used for winding extensible films.

In another embodiment, the rolls of trimmed cardboard $L_r$ could instead be longer than the required or desired length $L_t$ of cardboard tubes. In this embodiment, an initial cardboard tube could be formed and then cut into one or more cardboard tubes having the required or desired length $L_t$.

Alternatively, when the length $L_r$ of the cardboard sheet roll does not exactly correspond to the desired length of the convolute cardboard tube 20, the tube 20 can be formed by at least two convolute cardboard tubes connected to one another by any suitable manner, such as with adhesive, male-female joints, or by spiralling a finishing band around the joined tubes.

EXAMPLE 1

Table 1 below contains results of testing performed on a first set of convolute cardboard tubes, compared to results of similar tests performed on conventional spiraled tubes. Specifically, each test was performed on a tube having a length of 150 mm. The test consisted of applying a force radially inwardly in a uniform manner around the entire circumference of the tube and was gradually increased until failure of the tube. The force applied is then divided by the area over which the force is applied to obtain a value of ultimate radial compression strength for the tubes which is independent of the size (i.e. diameter and length) of the tube.

TABLE 1

Comparison of radial compression resistance between conventional spiralled tubes and convolute cardboard tubes for different wall thickness (first series of tests)

| | | Ultimate radial compression strength (bar) | | |
|---|---|---|---|---|
| Test # | Cardboard thickness (mm) | Conventional spiralled tube | Convolute cardboard tube | Improvement in radial compression strength (%) |
| 1.1 | 2.7 | 12 | 15 | 20% |
| 1.2 | 4.6 | 20 | 25.42 | 21% |
| 1.3 | 7.9 | 38 | 44 | 14% |
| 1.4 | 10.2 | 49 | 55 | 11% |

The results in Table 1 show that the radial compression strength of the convoluted cardboard tubes is greater than the corresponding spiraled tubes for every cardboard thickness tested. In at least one case (i.e. a cardboard thickness of 4.6 mm), the convoluted cardboard tube even showed an improvement of about 21% in radial compression strength over the corresponding spiraled tube.

EXAMPLE 2

Table 2 below contains results of testing performed on a second set of convolute cardboard tubes, again compared to results of similar tests performed on conventional spiraled tubes. The test again consisted of applying a force radially inwardly in a uniform manner around the entire circumference of the tube and was gradually increased until failure of the tube. Conventional spiraled tubes and convolute cardboard tubes with various cardboard thicknesses were selected, and the test was repeated on three convolute cardboard tubes for each cardboard thickness. In this example, both the conventional spiraled tube and the convolute cardboard tube tested were made of cardboard having a weight of 160 gsm and a humidity level of about 5%.

TABLE 2

Comparison of radial compression resistance between conventional spiralled tubes and convolute cardboard tubes for different wall thickness (second series of tests)

| | | Ultimate radial compression strength (bar) | | Ultimate radial compression strength per unit of thickness (bar/mm) | |
|---|---|---|---|---|---|
| Test # | Cardboard thickness (mm) | Conventional spiralled tube | Convolute cardboard tube | Conventional spiralled tube | Convolute cardboard tube |
| 2.1 | 3 | 12 | 18.34 | 4.00 | 6.11 |
| 2.2 | 3 | 12 | 17.65 | 4.00 | 5.88 |
| 2.3 | 3 | 12 | 18.48 | 4.00 | 6.16 |
| 2.4 | 3.5 | 15 | 24.83 | 4.29 | 7.09 |

TABLE 2-continued

Comparison of radial compression resistance between conventional spiralled tubes and convolute cardboard tubes for different wall thickness (second series of tests)

| Test # | Cardboard thickness (mm) | Ultimate radial compression strength (bar) | | Ultimate radial compression strength per unit of thickness (bar/mm) | |
|---|---|---|---|---|---|
| | | Conventional spiralled tube | Convolute cardboard tube | Conventional spiralled tube | Convolute cardboard tube |
| 2.5 | 3.5 | 15 | 26.36 | 4.29 | 7.53 |
| 2.6 | 3.5 | 15 | 25.21 | 4.29 | 7.20 |
| 2.7 | 3.8 | 18 | 26.78 | 4.74 | 7.05 |
| 2.8 | 3.8 | 18 | 24.68 | 4.74 | 6.49 |
| 2.9 | 3.8 | 18 | 23.95 | 4.74 | 6.30 |

In this example, in addition to determining the ultimate radial compression strength for each tube as was done in Example 1, the ultimate radial compression strength per unit of thickness was also determined. The results show that the ultimate radial compression strength of the convoluted cardboard tubes configured as disclosed herein in consistently higher than the ultimate radial compression strength of conventional spiraled tube for the same thickness of tube.

Convolute Tube Manufacturing Apparatus

Now turning to FIGS. 4 to 7, there is shown a convolute tube manufacturing apparatus 100 for manufacturing a convolute wound tube such as the convolute cardboard tube 20, in accordance with one embodiment. In this embodiment, the apparatus 100 includes a frame 102 having an input end 104 at which paper is provided to the apparatus 100 and an output end 106 located opposite the input end 106. The frame 102 is configured to receive a paper roll 150 at the input end 104 to feed paper towards the output end 106. Specifically, the paper roll 150 is rotatable about a roll axis $R_1$ to unwind a length of paper, or unwound cardboard sheet 160, from the paper roll 150. The unwound cardboard sheet 160 includes an end edge 152 (best shown in FIG. 7) which is moved in a machine direction M towards the output end 106 by a plurality of intermediate rollers 110 disposed between the input and output ends 104, 106. In one embodiment, the intermediate rollers 110 are further movable selectively upwardly and downwardly by corresponding actuators to allow the user to set a desired tension in the unwound cardboard sheet 160.

The “machine direction” M refers to a direction of travel of the unwound cardboard sheet 160 through the apparatus 100, from the input end 104 to the output end 106. This direction is also tangential to the paper roll, and perpendicular to the roll axis $R_1$. The “transversal direction” T refers to a direction which is substantially perpendicular to the machine direction.

The apparatus 100 further includes a tube forming roller 112 which is rotatably connected to the frame 102 and is rotatable about a tube roller axis $R_2$. The tube forming roller 104 is configured for engaging the end edge 152 of the paper roll 150 and rotates to wind or convolute the paper roll 150 around the tube forming roller 104. Specifically, the apparatus 100 includes a prehension mechanism 200 for engaging the end edge of the unwound sheet of paper. This allows the end edge 152 of the unwound sheet of paper to be guided along a circular path around the tube forming roller 104 to form the first winding of the convolute tube. Once the first winding of the tube is formed, the end edge 152 is wedged under the unwound sheet of paper which is being wound over it and therefore the prehension mechanism 200 can be deactivated. Alternatively, the prehension mechanism 200 could remain activated during an entire forming of the convoluted cardboard tube 20.

The tube forming roller 104 has a diameter which is substantially equal to an inner diameter of the convolute cardboard tube 20. In one embodiment, the tube forming roller 104 has a diameter of between about 40 mm and 200 mm, and more specifically of between about 74 mm and 78 mm, and even more specifically of about 76 mm. Alternatively, the tube forming roller 104 could have a larger or smaller diameter.

In this configuration, both the unwinding of the paper from the paper roll 150 and the winding or convoluting of the unwound cardboard sheet 160 around the tube forming roller 112 can therefore be performed in one, continuous motion. Specifically, the tube forming roller 112 is oriented such that when the paper roll 150 is received on the frame 102, the tube roller axis $R_2$ and the roll axis $R_1$ are parallel to each other. The unwound cardboard sheet 160 therefore keeps moving in the machine direction as it is unwound from the paper roll 150 and as it is wound around the tube forming roller 112 to form the convolute cardboard tube 20.

In an embodiment in which the convolute cardboard tube includes a plurality of fibers of which at least a majority are aligned in a tangential direction relative to the convolute cardboard tube 20, the paper roll 150 is selected such that the cardboard on the paper roll includes fibers which are also oriented in a tangential direction relative to the paper roll 150, i.e. in the machine direction. The fibers therefore remain aligned in the machine direction M as the unwound cardboard sheet 160 travels from the input end 104 to the output end 106.

In the illustrated embodiment, the apparatus 100 further includes an adhesive application assembly for applying adhesive to the unwound cardboard sheet 160 being wound on the tube forming roller 112. In one embodiment, the adhesive application assembly is configured to apply adhesive on an underside of the unwound cardboard sheet 160, upstream of the tube forming roller 112, such that as the unwound cardboard sheet 160 is wound to form a winding over a previous winding underneath, the unwound cardboard sheet 160 is simultaneously glued on the previous winding. In another embodiment, the adhesive application assembly could instead be configured to apply adhesive on an outer side of each winding as it makes a full rotation around the tube forming roller 112 and is moved underneath the unwound cardboard sheet 160 which forms a new winding over it, thereby gluing the winding to the underside of the unwound cardboard sheet 160. In one embodiment, the adhesive could be selected from a group consisting of PVA, dextrin and silicate. Alternatively, the adhesive could include any other suitable adhesive.

In the illustrated embodiment, the piece of cardboard sheet forming the convolute cardboard tube 20 is only separated from the rest of the unwound cardboard sheet 160 once the convolute cardboard tube 20 has been formed. Specifically, the apparatus 100 further includes a cutting assembly located upstream of the tube forming roller 112, towards the input end 104. Once the unwound cardboard sheet 160 has been wound a desired number of times to form a desired number of windings and a desired thickness of the convolute cardboard tube 20, the cutting assembly may be moved towards the unwound cardboard sheet 160 to separate the formed convolute cardboard tube 20 from the rest of the unwound cardboard sheet 160. In this configuration, the apparatus 100 therefore manipulates a single piece of paper, i.e. the unwound cardboard sheet 160, instead of multiple separate pieces, which simplifies the manufacturing process.

Alternatively, the piece of cardboard sheet forming the convolute cardboard tube 20 which is used to form the convolute cardboard tube 20 may be separated from the rest of the unwound cardboard sheet 160 prior to forming the convolute cardboard tube 20.

Figure 7:
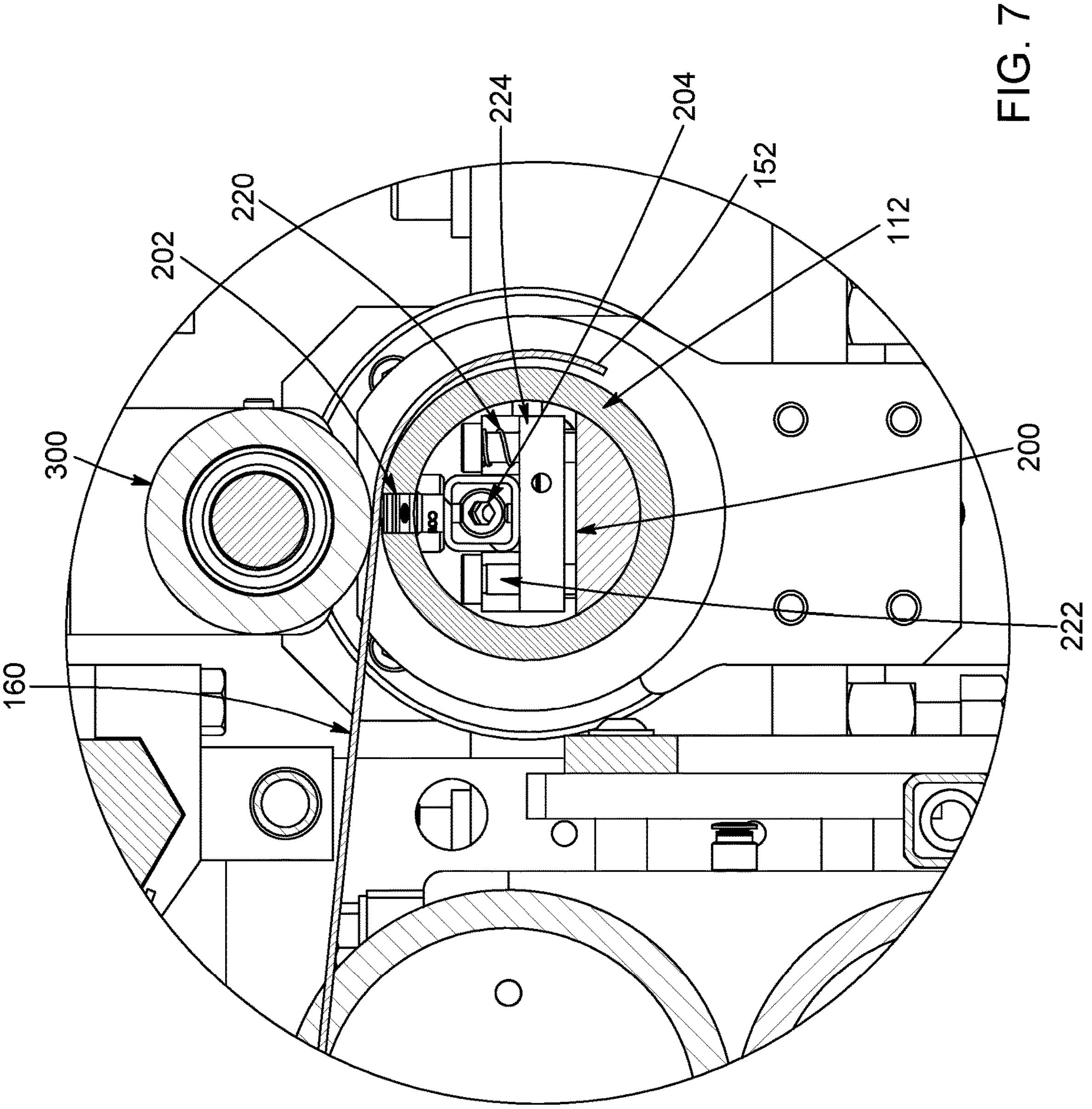
FIG. 7 is an enlarged portion of the side cross-sectional view of FIG. 6, taken from area A and showing details of a prehension mechanism for engaging an end edge of the cardboard roll.
Figure 8A:
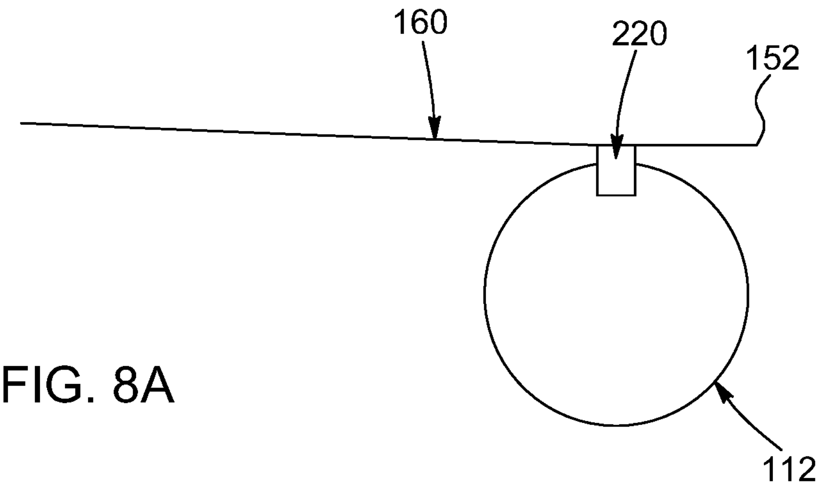
FIG. 8A is a schematic drawing showing a side cross-section view of the tube forming roller illustrated in FIG. 7, in a first position in which the suction nozzle members are in an extended position and the suction actuator is activated to allow the suction nozzle members to engage and hold the end edge of the cardboard roll.
Figure 8B:
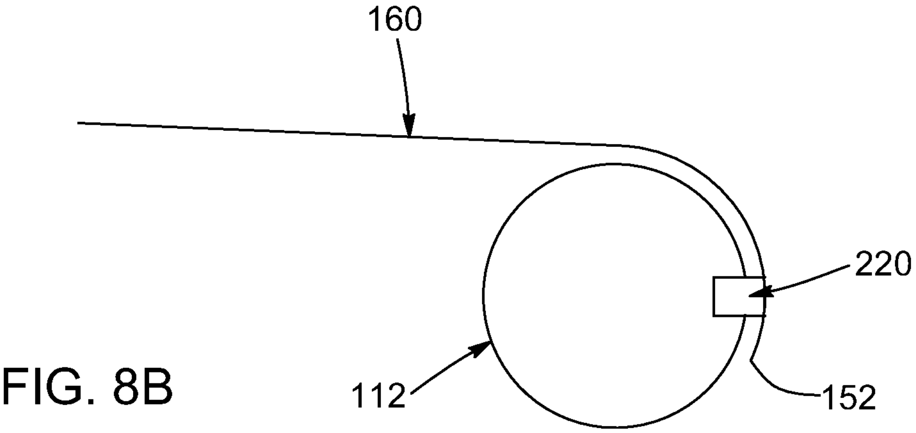
FIG. 8B is a schematic drawing showing a side cross-section view of the tube forming roller illustrated in FIG. 7, in a second position in which the tube forming roller is partially rotated relative to the first position such that a first winding of the convolute cardboard tube is partially formed around the tube forming roller.
Figure 8C:
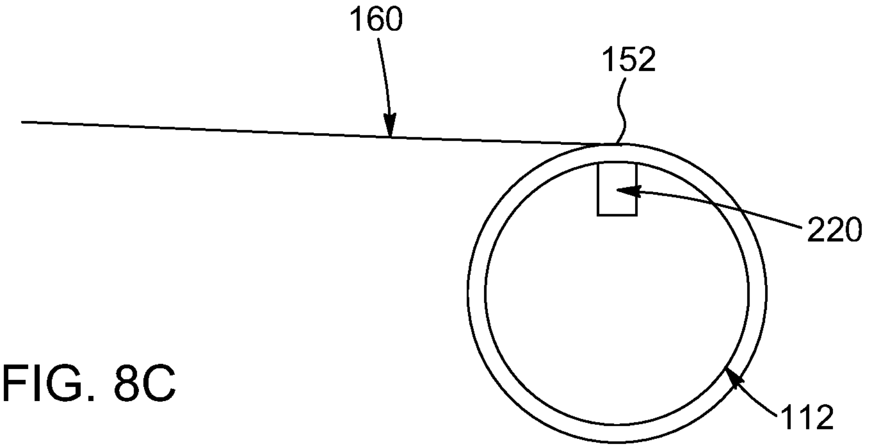
FIG. 8C is a schematic drawing showing a side cross-section view of the tube forming roller illustrated in FIG. 7, in a third position in which the first winding of the convolute cardboard tube is fully formed around the tube forming roller.

Now turning to FIGS. 7 to 8C, the prehension mechanism 200 includes a plurality of suction openings 202 defined in the tube forming roller 112. Specifically, the tube forming roller 112 is hollow and includes an inner channel 204 in fluid communication with the suction openings 202. The inner channel 204 is further operatively connected to a vacuum source such as a pump or the like to create suction through the suction openings 202. Specifically, the suction created is sufficient to hold the end edge 152 against the tube forming roller 112.

In the illustrated embodiment, the suction openings 202 are aligned with each other substantially parallel to the tube roller axis $R_2$. Alternatively, the suction openings 202 could be disposed in any other suitable pattern. Still in the illustrated embodiment, each suction opening 202 is substantially circular, but alternatively, the suction openings 202 could be elongated or have any other shape.

In the illustrated embodiment, the prehension mechanism 200 further includes a plurality of suction nozzle members 220. Each nozzle member 220 is received in a corresponding suction opening 202 and is movable relative to the tube forming roller 112. Specifically, each suction nozzle member 220 is selectively movable between an extended position in which the suction nozzle member 220 extends partially outwardly from the corresponding suction opening 202 and a retracted position in which the suction nozzle member 220 is fully retracted within the tube forming roller 112.

In the illustrated embodiment, each suction nozzle member 220 is connected to a nozzle member actuator 222 such as a solenoid actuator or an electromagnet which, when activated, moves the suction nozzle member 220 from the retracted position to the extended position. Still in the illustrated embodiment, the suction nozzle member 220 is further connected to a spring member 224 which biases the suction nozzle member 220 towards the retracted position. In this embodiment, when the nozzle member actuator 222 is deactivated, the spring member 224 moves the suction nozzle member 220 from the extended position back to the retracted position. Alternatively, the nozzle member actuator 222 could instead include a two-way actuator which could both move the suction nozzle member 220 from the retracted position to the extended position and from the extended position to the retracted position.

As shown in FIG. 8A, the suction nozzle member 220 is first in the extended position to engage the end edge 152 or the unwound cardboard sheet 160 proximal the end edge 152. In this position, the vacuum source is further activated to provide suction through the suction nozzle member 220. As the tube forming roller 112 is rotated forward, as shown in FIG. 8B, the suction nozzle member 220 maintains the unwound cardboard sheet 160 against the tube forming roller 112. The tube forming roller 112 is then further rotated until the end edge 152 is tucked under the unwound cardboard sheet 160 and the first winding is formed, as shown in FIG. 8C. At this point, the vacuum source could be deactivated and the suction nozzle members 220 could be moved to the retracted position as the remaining windings are formed. In one embodiment, the vacuum source could remain activated and the suction nozzle members 220 could remain in the extended position as the first few windings are formed to ensure that there is sufficient friction between the windings to prevent the windings from becoming undone from the tube forming roller 112 before moving the suction nozzle members 220 in the retracted position.

In one embodiment, the tube forming roller 112 is rotated at a first rotation speed when forming the first winding or the first few windings, and then rotated at a second rotation speed greater than the first rotation speed when forming the remaining windings. Alternatively, the tube forming roller 112 could instead be rotated at constant speed through the forming of all the windings.

Still in the illustrated embodiment, the apparatus 100 further includes an upper holding roller 300 rotatably connected to the frame 102 and disposed above the tube forming roller 112. Specifically, the upper holding roller 300 extend generally parallel to the tube forming roller 112 and is movable substantially vertically. The upper holding roller 300 is further operatively connected to an upper holding roller actuator for selectively moving the upper holding roller 300 between an idle position in which the upper holding roller 300 is spaced upwardly from the tube forming roller 112 and a holding position in which the upper holding roller is lowered towards the tube forming roller 112 to hold the unwound cardboard sheet 160 against the tube forming roller 112. Alternatively, the apparatus 100 may not includes an upper holding roller 300.

In the illustrated embodiment, the apparatus 100 further includes a tube removal assembly 400 for removing the convolute cardboard tube 20 from the tube forming roller 112 once formed. Specifically, the tube removal assembly 400 includes a carriage 402 movable along a travel path parallel to the tube roller axis $R_2$ and an abutting element 404 secured to the carriage 402 and located proximal to the tube forming roller 112.

Figure 5A:
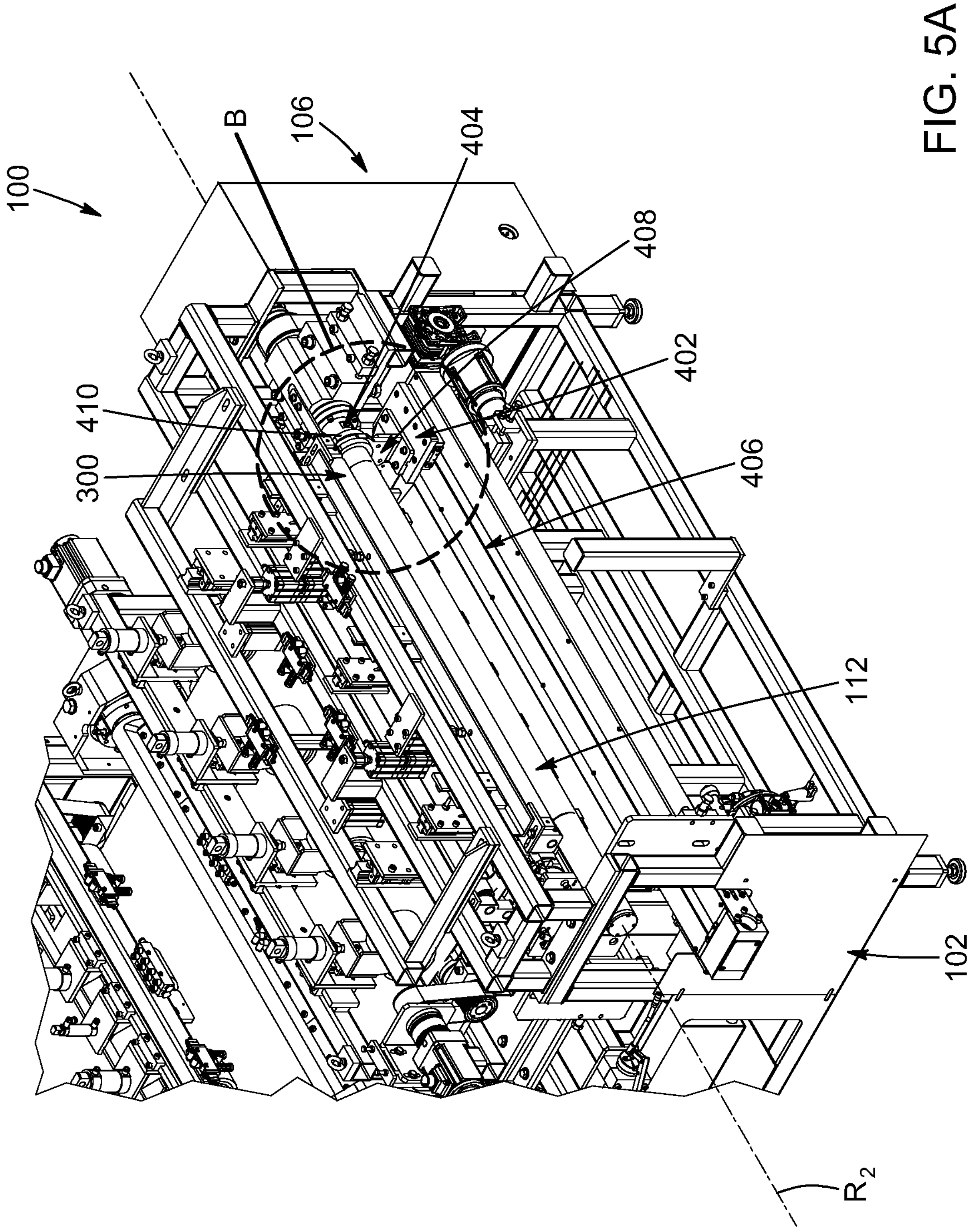
FIG. 5A is a perspective view showing a portion of the convolute tube manufacturing apparatus illustrated in FIG. 4, showing details of the tube forming roller and the cutting assembly.
Figure 5B:
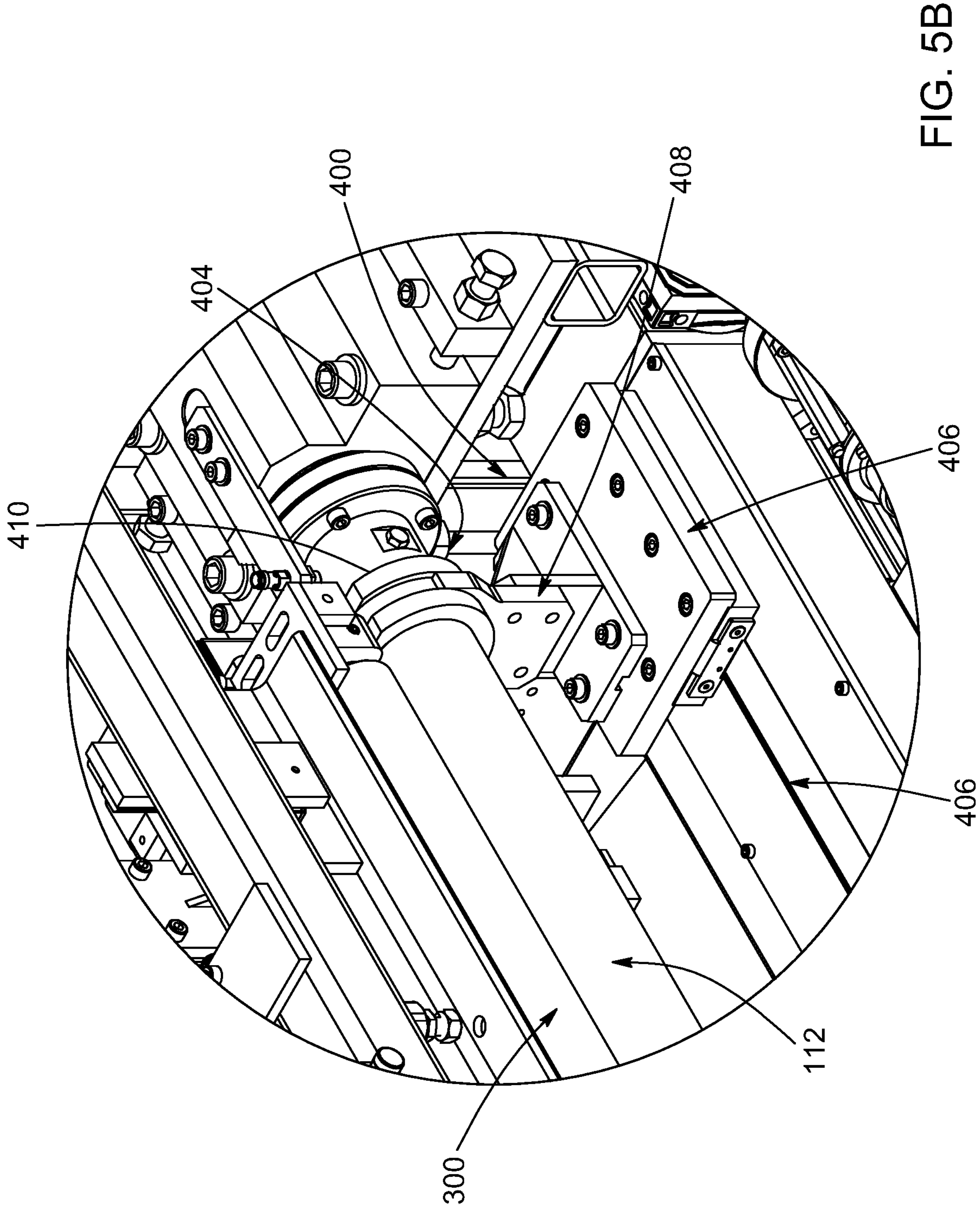
FIG. 5B is an enlarged portion of perspective view of FIG. 5A, taken from area B and showing details of a tube removal assembly.
Figure 6:
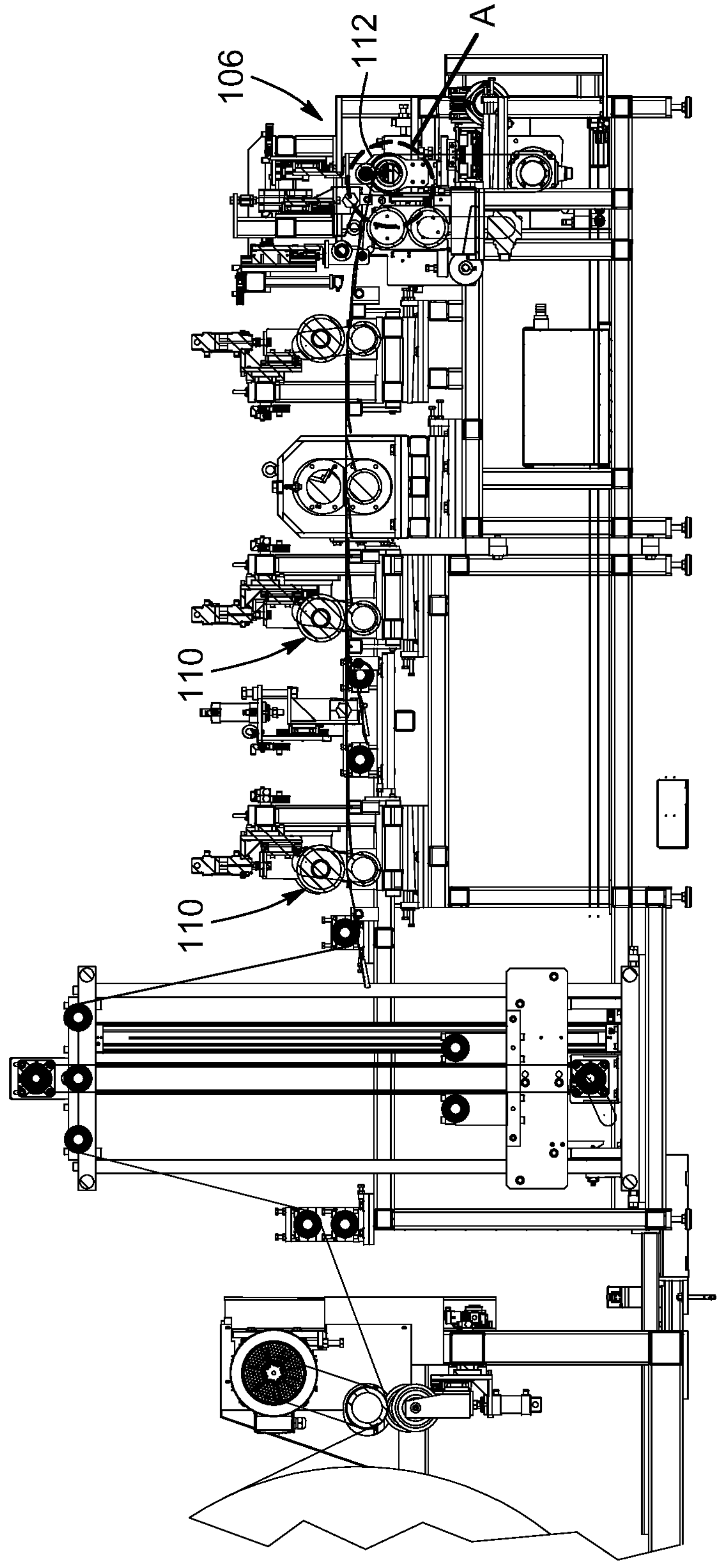
FIG. 6 is a side cross-sectional view of the convolute tube manufacturing apparatus illustrated in FIG. 4.

As shown in FIGS. 5A and 5B, the carriage 402 is operatively mounted on a carriage track 406 which extends underneath the tube forming roller 112 and is movable therealong. The abutting element 404 is connected to the carriage 402 via a support member 408 which extends substantially vertically between the carriage 402 and the abutting element 404. In the illustrated embodiment, the abutting element 404 includes an annular member 410 extending coaxially around the tube forming roller 112. Specifically, the annular member 410 has an inner diameter which is smaller than an outer diameter of the formed convolute cardboard tube 20. In this configuration, movement of the carriage 402 along its travel path on the carriage track 406 causes the annular member 410 to move along the tube forming roller 112 and to push the formed convolute cardboard tube 20 towards one end of the tube forming roller 112 until it is completely removed from the tube forming roller 112. The carriage 402 can then move back to its initial position and a new convolute cardboard tube 20 can then be formed on the tube forming roller 112.

It will be appreciated that the apparatus 100 described above provides a relatively fast and completely automated way of manufacturing convolute cardboard tubes such as the convolute cardboard tube 20. For example, in some embodiments, the apparatus 100 could be configured to wind the unwound cardboard sheet 160 to form the convolute cardboard tube 20 at a speed of about 1 m/s to about 2 m/s, and to form on average about three convolute cardboard tubes 20 per minute. Moreover, by using a paper roll which includes fibers of which at least a majority are aligned in a tangential direction, i.e. in the machine direction M, the formed convolute cardboard tube 20 includes a plurality of fibers of which a majority is also aligned in a tangential direction, which, as explained above, provides enhanced radial compression resistance to the convolute cardboard tube 20.

Moving the unwound cardboard sheet 160 in a single direction, i.e. the machine direction M, as opposed to cutting the unwound cardboard sheet 160 which are then moved independently laterally for example, further simplifies and accelerates the manufacturing process.

Convolute Cardboard Tube Manufacturing Process

Turning now to FIGS. 9A to 9F, there is shown a method for manufacturing a convolute cardboard tube such as the convolute cardboard tube 20, in accordance with one embodiment. Although the following method is described in connection with the apparatus 100 described above, it will be understood that this is provided an example only and that the method could instead be performed with a different apparatus.

A paper roll such as the paper roll 150 is first provided and unwound. Specifically, the paper roll includes cardboard which has been preselected according to one desired characteristic. For example, the paper roll 150 includes a preselected cardboard which comprises a plurality of fibers which are aligned substantially in a tangential direction relative to the paper roll 150.

Figure 4:
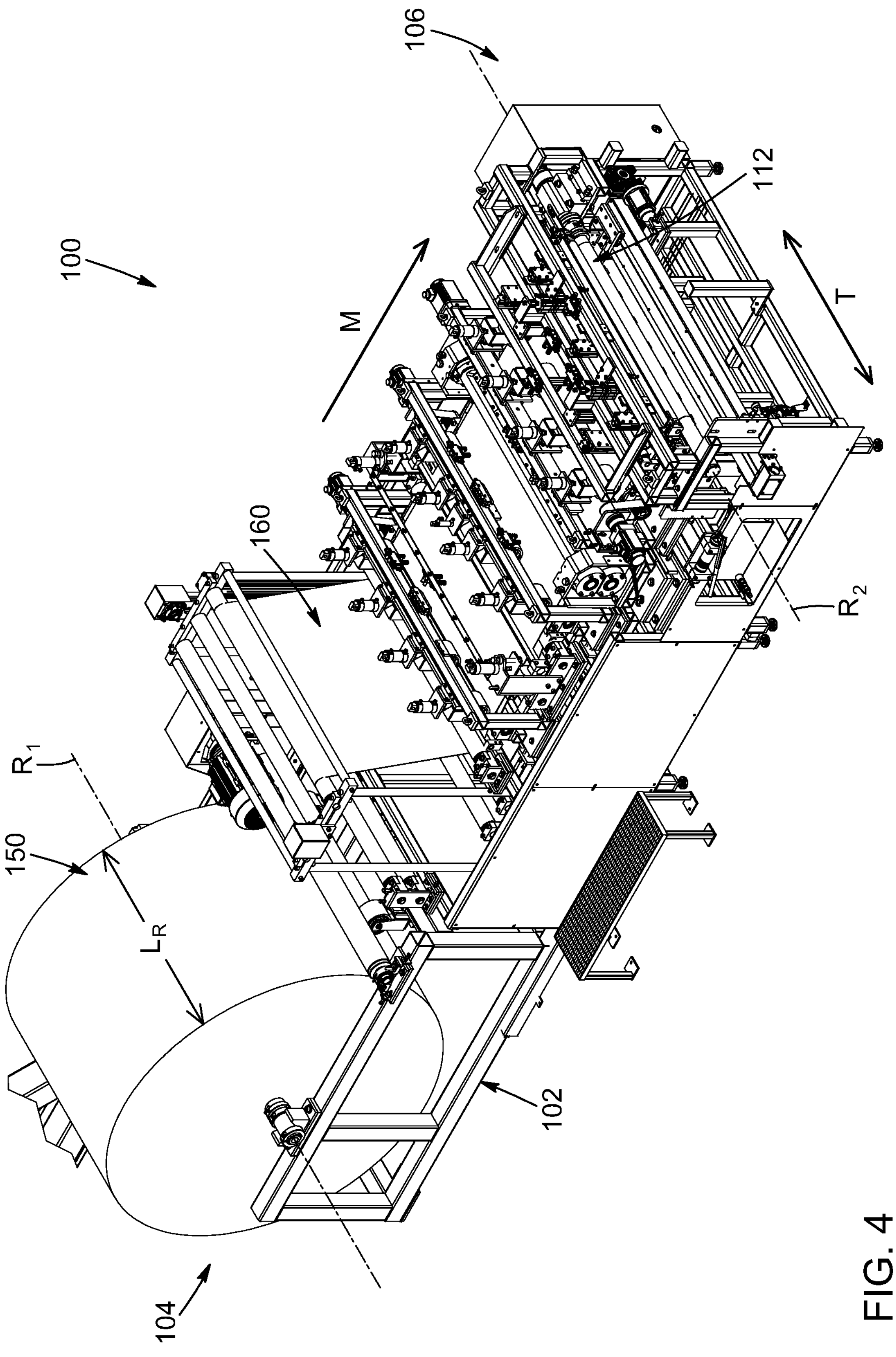
FIG. 4 is a perspective view of a convolute tube manufacturing apparatus, in accordance with one embodiment.

In the illustrated embodiment, the paper roll 150 is installed on the frame 102, towards the input end 104, as shown in FIG. 4. The paper roll 150 can then be unwound in the machine direction M to form the unwound cardboard sheet 160. The end edge 152 is then moved towards the output end 106 until it engages the tube forming roller 112.

The unwound cardboard sheet 160 can then be straight rolled or convoluted to form the convolute cardboard tube 20 such that the convolute cardboard tube 20 includes the fibers aligned in the machine direction M. In one embodiment, the unwound cardboard sheet 160 can be wound at a speed of between about 1 and 3 m/s. Alternatively, the unwound cardboard sheet 160 could be wound at a lower or higher speed.

Figure 9A:
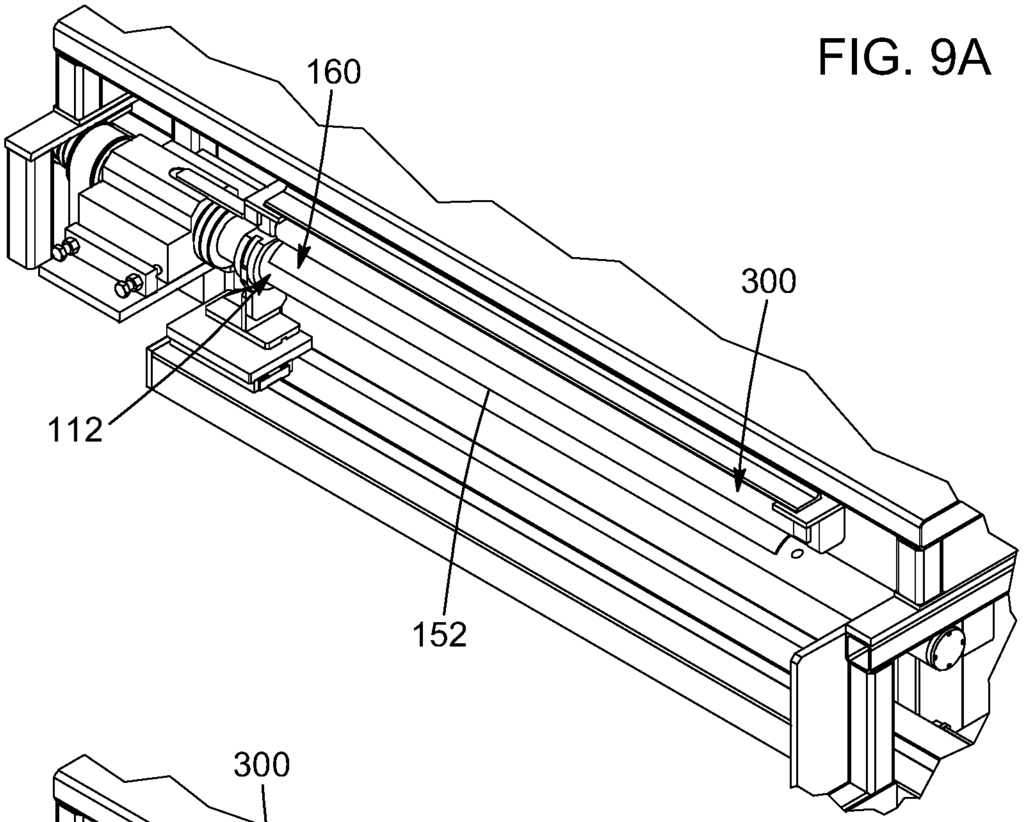
FIG. 9A is a perspective view of a portion located towards the output end of the apparatus illustrated in FIG. 5, with the end edge of the paper roll positioned between the tube forming roller and an upper holding roller, with the upper holding roller being spaced upwardly from the end edge.

Referring to FIG. 9A, to convolute the unwound cardboard sheet 160 to form the convolute cardboard tube 20 according to one embodiment, the end edge 152 is positioned above the tube forming roller 112. The upper holding roller 300 is in the idle position such that it is spaced upwardly from the tube forming roller 112 and the end edge 152 is positioned between the tube forming roller 112 and the upper holding roller 300.

Figure 9B:
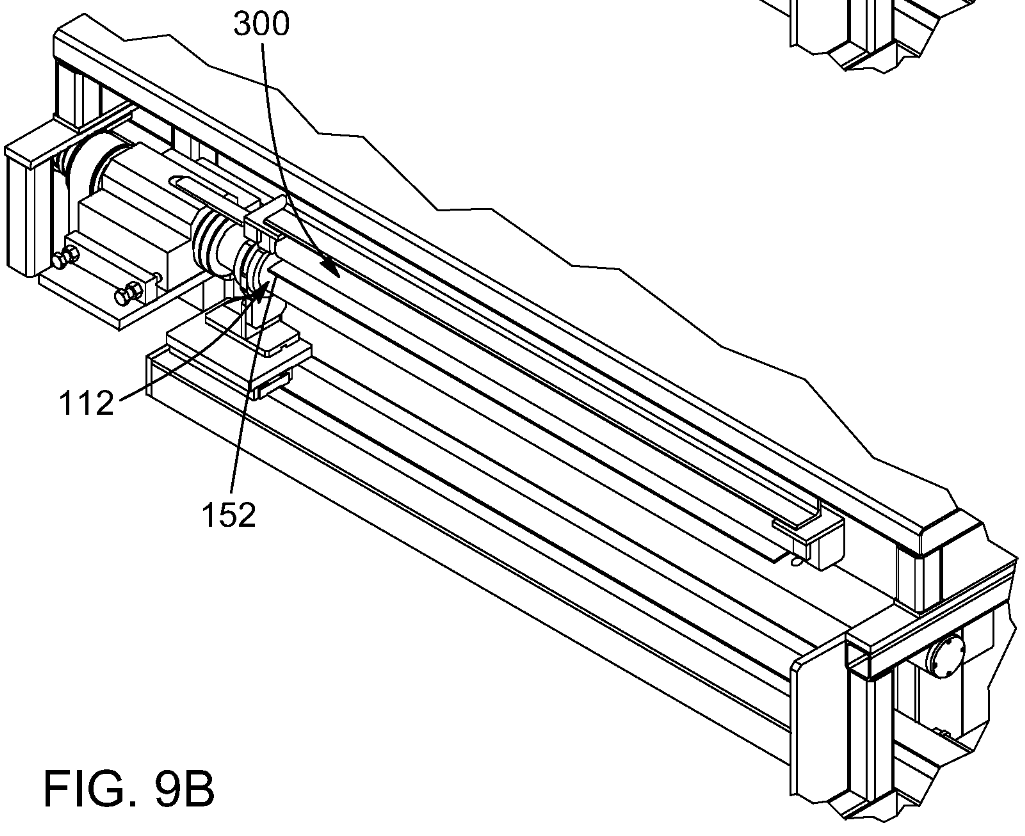
FIG. 9B is a perspective view of a portion of the apparatus illustrated in FIG. 5, with the upper holding roller lowered towards the tube forming roller to hold the end edge between the upper holding roller and the tube forming roller.

As shown in FIG. 9B, the upper holding roller 300 is then lowered to the holding position, in which it abuts the unwound cardboard sheet 160 above the tube forming roller 112. The vacuum source is then engaged to create suction through the suction openings 202 to hold the end edge 152 against the tube forming roller 112. The suction nozzle members 220 may further be positioned in the extended position.

Figure 9C:
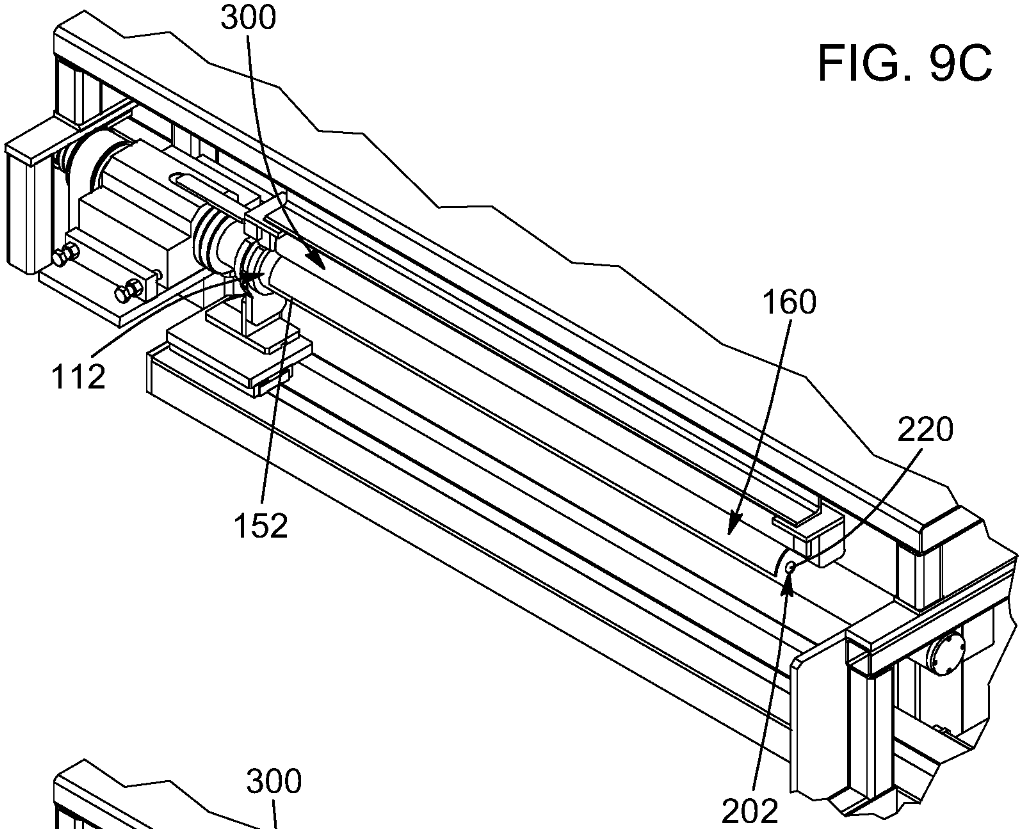
FIG. 9C is a perspective view of a portion of the apparatus illustrated in FIG. 5, with the prehension mechanism activated to hold the end edge against the tube forming roller as the tube forming roller rotates.

As shown in FIG. 9C, the tube forming roller 112 may then be rotated forwardly to form the first winding, with the end edge 152 remaining held against the tube forming roller 112. The tube forming roller 112 may then further be rotated, at the same speed or at a greater speed, to form the remaining windings, during which time the vacuum source may be deactivated and the suction nozzle members 220 may be moved back to the retracted position. Adhesive such as PVA, dextrin or silicate is further provided as the tube forming roller 112 is rotated, as described above. In one embodiment, the tube forming roller is rotated in total from 6 to 10 times to form a convolute cardboard tube 20 having from 6 to 10 layers of cardboard. Alternatively, the tube forming roller could be rotated in total less than 6 times or more than 10 times.

Figure 9D:
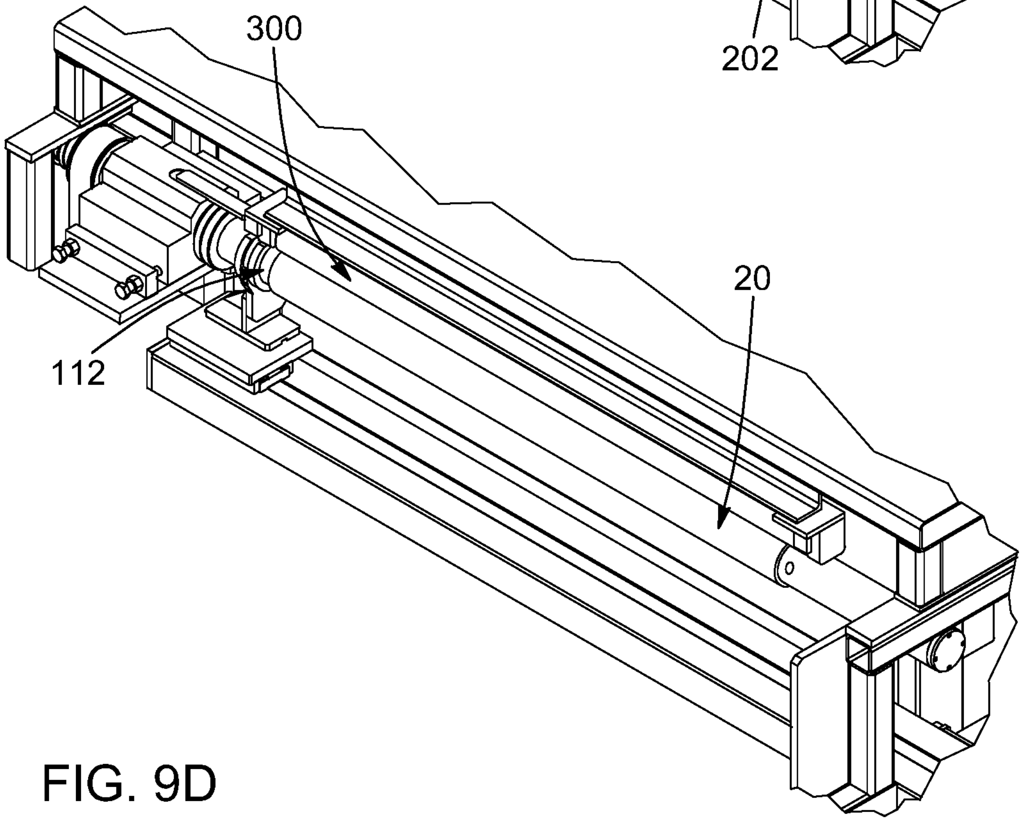
FIG. 9D is a perspective view of a portion of the apparatus illustrated in FIG. 5, with the convolute cardboard tube formed on the tube forming roller and the upper holding roller still lowered and abutting the convolute cardboard tube.

FIG. 9D shows the convolute cardboard tube 20 formed around the tube forming roller 112, with the upper holding roller 300 abutting the convolute cardboard tube 20. As shown in FIG. 9E, the upper holding roller 300 is then raised back to its idle position. The unwound cardboard sheet 160 is cut in a widthwise direction, proximal to the tube forming roller 112, to separate the convolute cardboard tube 20 from the rest of the unwound cardboard sheet 160. In one embodiment, the unwound cardboard sheet 160 is cut before the upper holding roller 300 is raised, but alternatively, it could be cut after the upper holding roller 300 is raised.

As shown in FIG. 9F, the convolute cardboard tube 20 can then be removed from the tube forming roller 112. In the illustrated embodiment, the convolute cardboard tube 20 is removed using the tube removal assembly 400. Specifically, the carriage 402 is moved along the carriage track 406 such that the annular member 110 pushes the convolute cardboard tube 20 towards an end of the tube forming roller 112 and entirely off the tube forming roller 112.

It will be appreciated that the location at which the unwound cardboard sheet 160 was cut now defines a new end edge of the unwound cardboard sheet 160, which can then be engaged by the prehension mechanism 200 to form a new convolute cardboard tube 20.

In one embodiment, the adhesive is then set. Specifically, the adhesive could be set merely by waiting a certain amount of time. Alternatively, the adhesive could be set or cured using an active adhesive setting technique such as using ultraviolet light, heat or any other suitable technique.

In one embodiment, the convolute cardboard tube 20 may also be dried to reduce its humidity level to a desired humidity level, which could be substantially equal to or lower than about 7% and more specifically of about 4.5%. The drying could be performed by letting the convolute cardboard tube 20 sit in a relatively dry environment for a certain amount of time, or could be performed using a drying apparatus. Alternatively, the convolute cardboard tube 20 may not be dried.

In one embodiment, a film such as the plastic film 50 can then be wound around the convolute cardboard tube 20 to form the plastic film roll 15. Specifically, the winding of the plastic film 50 around the convolute cardboard tube 20 could be performed in the same facility, i.e. a plastic film roll manufacturing facility, as the manufacturing of the convolute cardboard tube 20. For example, if the convolute cardboard tube 20 is manufactured using the apparatus 100, the apparatus 100 may be provided at the plastic film roll manufacturing facility. This may contribute to maintaining the convolute cardboard tube 20 are the desired humidity level by reducing the time, the number of manipulations and the potential changes in environment between the manufacturing of the convolute cardboard tube 20 and the manufacturing of the plastic film roll 15. Alternatively, the convolute cardboard tube 20 could be manufactured at a first facility such as a convolute cardboard tube manufacturing facility and later transported to a second facility such as a plastic film roll manufacturing facility where the plastic film 50 is wound around the convolute cardboard tube 20.

As it can be appreciated, the convolute tube 20 of the invention is less expensive to manufacture than those known in the art, not only because it uses trimmed or reject cardboard as its raw material (indeed, rolls of trimmed cardboard, or reject rolls are relatively inexpensive relative to the cost of cardboard used up to now for manufacturing convolute or spiraled winding tubes or mandrels), but also because less material is required to form the tubes, thanks to the selection of cardboards with specific properties (weight, tensile resistance, humidity level, orientation of the fibers). The invention also helps to reduce greenhouse effects by using trimmed cardboard as its raw material, rather than requiring the manufacture of cardboard specifically for the purpose of creating tubes. It is also particularly adapted to the needs of applications involving radial compression, such as those using extensible or plastic films. Advantageously, because there are no spacing between to successive wounded strips or plies, as it is the case in spiraled cores, the core is less subject to breaking when being radially compressed.

Moreover, the fact that the convolute cardboard tube can resist the same radial compression force than a corresponding conventional spiraled tube while having a thinner wall than the corresponding conventional spiraled tube may have additional advantages. For example, wound cardboard tubes often experience a "rebound" effect in which the cut edge of the cardboard tube in the final wound layer may tend to move before the adhesive has fully set because of the slight tension that may have been created in the windings when the tube forming roller is rotated. It has been observed that forming a tube having a lower wall thickness reduces this rebound effect and thereby contributes to preventing movement of the cut edge relative to the rest of the tube while the adhesive sets.

Although preferred embodiments of the present invention have been described in detail herein and illustrated in the accompanying drawings, it is to be understood that the invention is not limited to these precise embodiments, and that various changes and modifications may be effected therein without departing from the scope of the present invention.

The invention claimed is:

1. A method for manufacturing a convolute cardboard tube, the method comprising:

unwinding a roll of a preselected cardboard in a machine direction tangential to the roll of the preselected cardboard by rotating the roll along a first rotation axis R1, thereby obtaining an unwound cardboard sheet, the preselected cardboard including a plurality of fibers, at least a majority of the plurality of fibers being substantially oriented in the machine direction;

straight rolling the unwound cardboard sheet onto a tube forming roller rotating about a second rotation axis R2 into the convolute cardboard tube, the convolute cardboard tube including at least a majority of the plurality of fibers oriented in a winding direction; and cutting the unwound cardboard sheet along its width, wherein the second rotation axis R2 is parallel to the first rotation axis R1; and wherein straight rolling the unwound cardboard sheet includes rotating the unwound cardboard sheet along the second rotation axis at a speed of about 1 m/s to about 3 m/s.

2. The method as claimed in claim 1, further comprising: after unwinding the roll of preselected cardboard, applying adhesive to the unwound cardboard.

3. The method as claim in claim 2, wherein the adhesive is PVA, dextrin or silicate.

4. The method as claim in claim 2, wherein the adhesive is ultraviolet-activating adhesive or heat-activating adhesive.

5. The method as claimed in claim 1, wherein the preselected cardboard includes trimmed cardboard.

6. The method as claimed in claim 1, wherein cutting the unwound cardboard sheet along its width is performed after the straight rolling of the unwound cardboard sheet into the convolute cardboard tube to separate the convolute cardboard tube from a rest of the unwound cardboard sheet.

7. The method as claimed in claim 1, wherein the preselected cardboard has a tensile resistance equal or greater than 60 kg/mm.

8. The method as claimed in claim 1, further comprising drying the convolute cardboard tube until the tube has a humidity level of less than or equal to 7%.

9. The method as claimed in claim 1, further comprising connecting at least two convolute cardboard tubes for forming another convolute cardboard tube of a desired length.

10. The method as claimed in claim 9, wherein connecting at least two convolute cardboard tubes for forming another convolute cardboard tube of a desired length further comprises connecting the at least two convolute tubes with adhesive, with male-female joints, or by spiraling a finishing band around the connected tubes.

11. The method as claimed in claim 1, further comprising cutting the convolute cardboard tube along its length to form at least one convolute cardboard tube piece having a desired length.

12. The method as claimed in claim 1, wherein unwinding the roll of the preselected cardboard and straight rolling the unwound cardboard sheet are performed simultaneously.

13. The method as claimed in claim 1, wherein straight rolling the unwound cardboard sheet includes rotating from 6 to 10 times the tube forming roller.

14. The method as claimed in claim 1, wherein the unwound cardboard sheet is cut proximal to the tube forming roller.

15. The method as claimed in claim 1, wherein an end edge of the unwound cardboard sheet is engaged and guided along a circular path around the tube forming roller to form a first winding of the convolute cardboard tube.

16. The method as claimed in claim 1, wherein the end edge is maintained around the tube forming roller with vacuum.

17. The method as claimed in claim 1, wherein after cutting the unwound cardboard sheet along its width, the convolute cardboard tube is removed from the tube forming roller by pushing an abutting element therealong.

* * * * *